United States Patent
Nakagata et al.

(10) Patent No.: US 9,635,245 B2
(45) Date of Patent: Apr. 25, 2017

(54) FOCUS POSITION DETECTION DEVICE AND FOCUS POSITION DETECTION METHOD

(71) Applicant: FUJITSU LIMITED, Kawasaki-shi, Kanagawa (JP)

(72) Inventors: Shohei Nakagata, Kawasaki (JP); Megumi Chikano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/047,109

(22) Filed: Feb. 18, 2016

(65) Prior Publication Data

US 2016/0255266 A1 Sep. 1, 2016

(30) Foreign Application Priority Data

Feb. 27, 2015 (JP) ................................. 2015-039505

(51) Int. Cl.
*H04N 5/232* (2006.01)

(52) U.S. Cl.
CPC ............................. *H04N 5/23212* (2013.01)

(58) Field of Classification Search
CPC ........ G02B 27/282; G02B 7/34; G03B 13/36; H04N 5/23212; H04N 5/2353; H04N 5/3696
See application file for complete search history.

(56) References Cited

U.S. PATENT DOCUMENTS

| | | | | |
|---|---|---|---|---|
| 8,890,972 B2* | 11/2014 | Kimijima | ................ | G02B 7/34 348/222.1 |
| 2011/0164166 A1* | 7/2011 | Oikawa | ................ | H04N 5/3696 348/340 |
| 2015/0201121 A1* | 7/2015 | Nobayashi | ................ | G02B 7/34 348/222.1 |
| 2015/0215517 A1* | 7/2015 | Kusaka | ................ | G02B 7/282 348/353 |
| 2016/0080634 A1* | 3/2016 | Hamano | ................ | G02B 7/365 348/349 |

FOREIGN PATENT DOCUMENTS

| | | |
|---|---|---|
| JP | 2000-009430 A | 1/2000 |
| JP | 2007-024941 A | 2/2007 |
| JP | 2010-206722 A | 9/2010 |
| JP | 2014-130231 A | 7/2014 |

* cited by examiner

*Primary Examiner* — Amy Hsu
(74) *Attorney, Agent, or Firm* — Fujitsu Patent Center

(57) ABSTRACT

A focus position detection device calculates, for each of shift amount calculation areas in a measurement area set on an image sensor of an imaging unit, a local shift amount of a second sub-image with respect to a first sub-image when a subject on the first sub-image and a subject on the second sub-image are most coincident with each other and a feature quantity of a probability distribution representing accuracy of the local shift amount, estimates the probability distribution based on the local shift amount and the feature quantity for each shift amount calculation area, combines the probability distributions of the shift amount calculation areas to obtain a distribution of accuracy of the local shift amount for the measurement area, and calculates a representative value representing the distance between a focus position produced by an optical system of the imaging unit and the image sensor based on the distribution.

21 Claims, 13 Drawing Sheets

FIG. 5
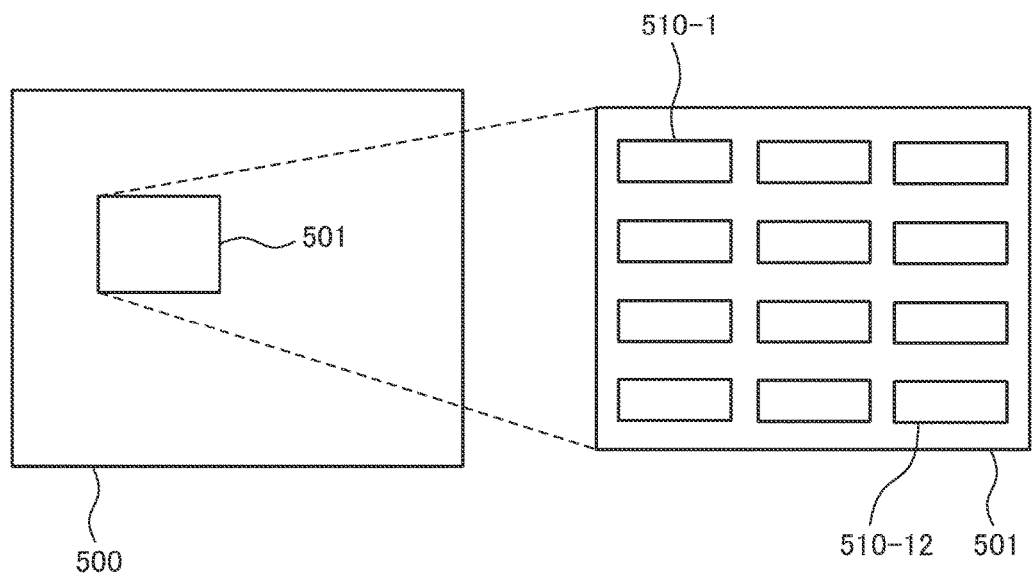
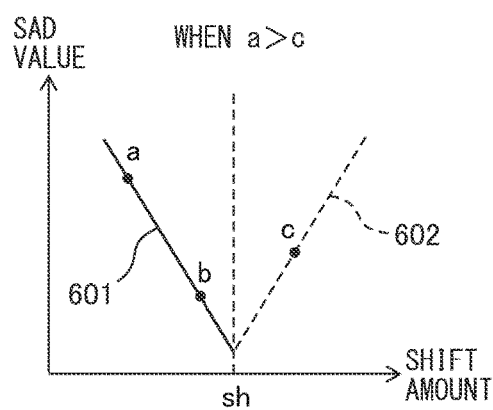
FIG. 6A
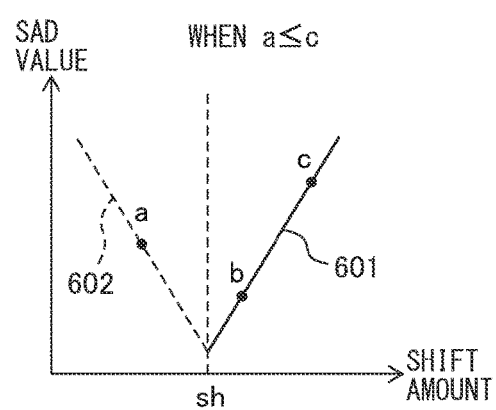
FIG. 6B

FIG. 7A
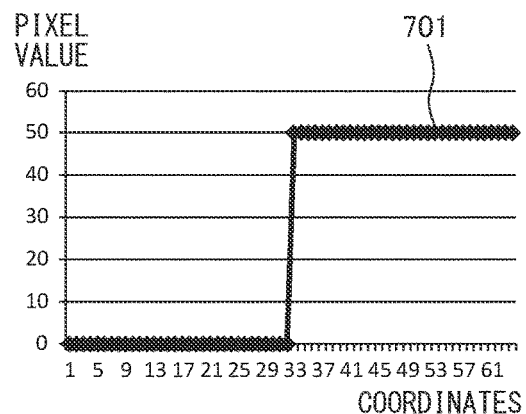
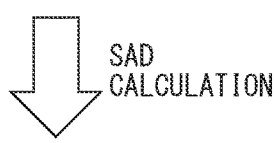
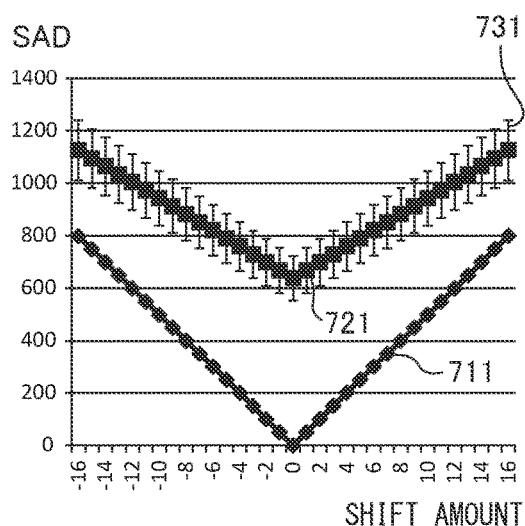
FIG. 7B
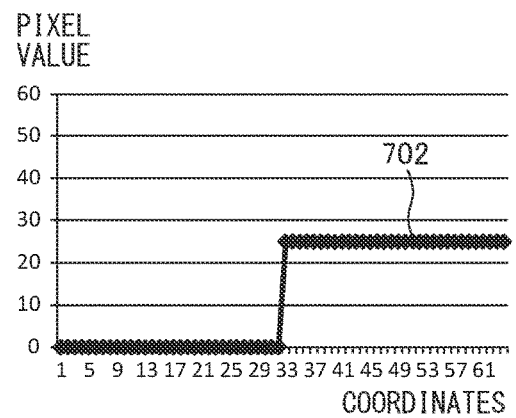
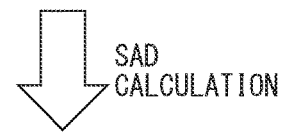
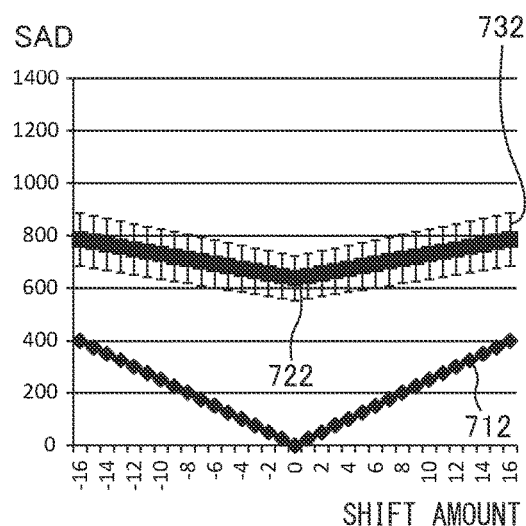

FIG. 8A
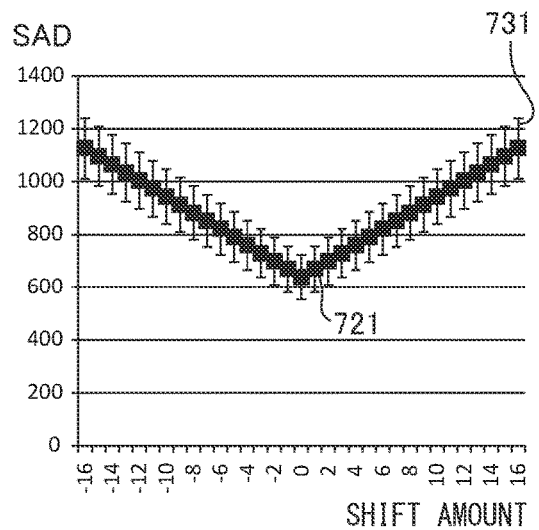
FIG. 8B
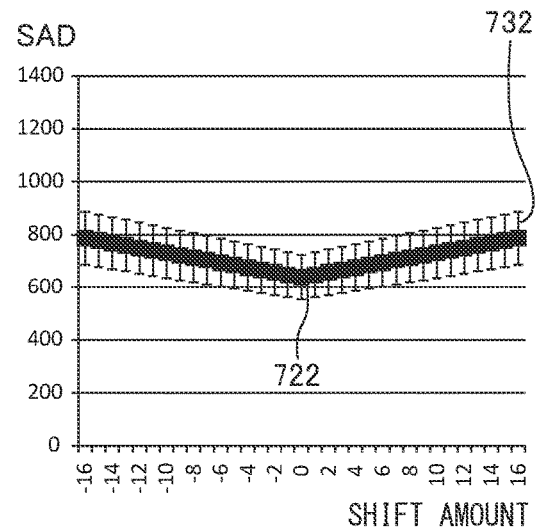
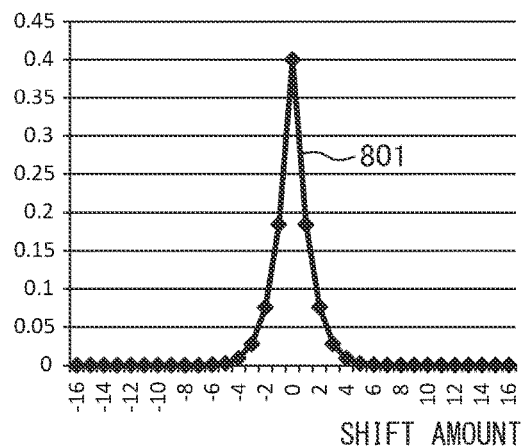
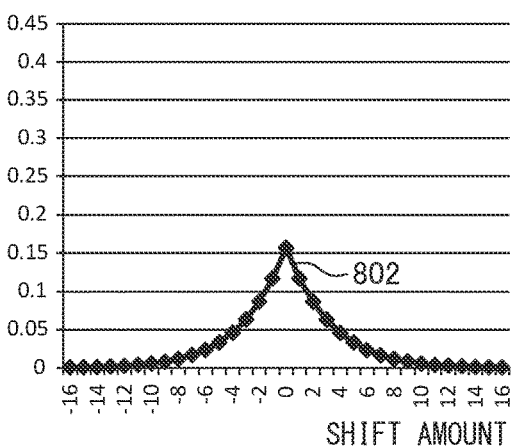

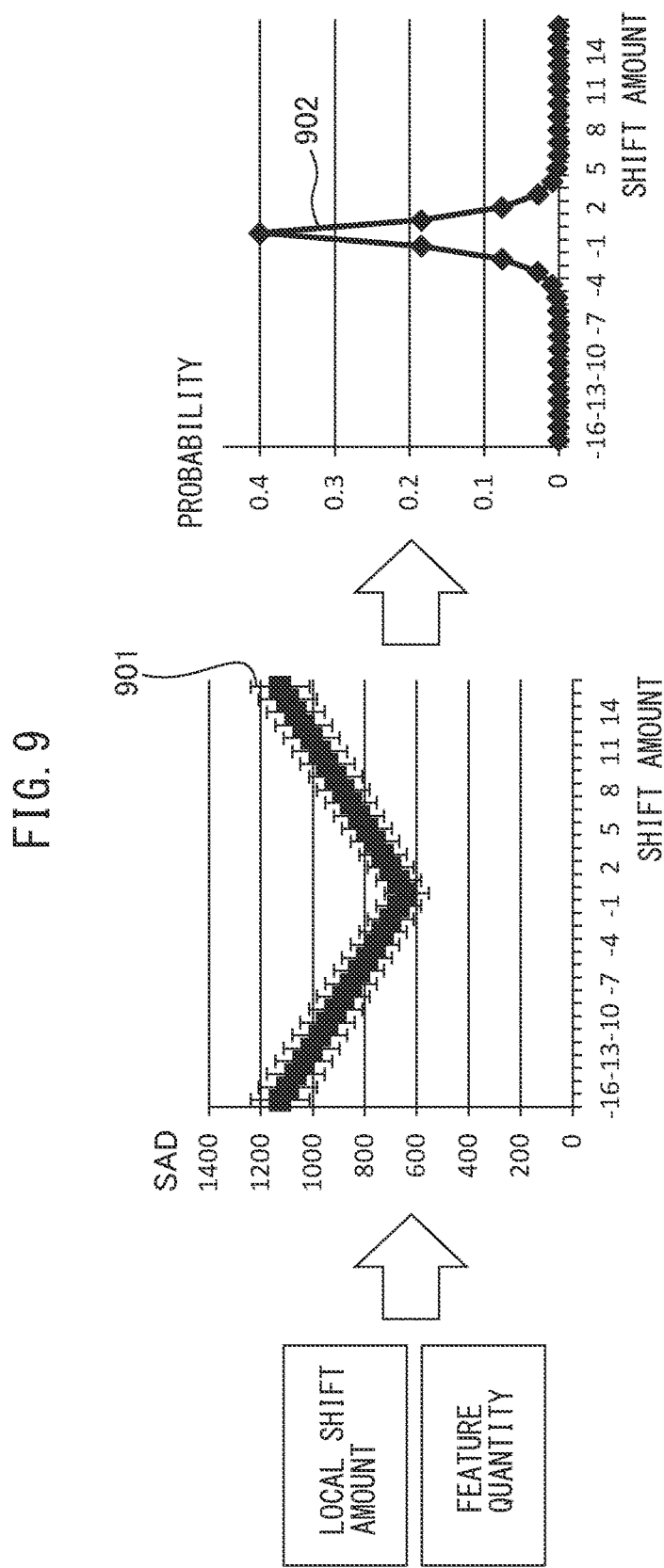

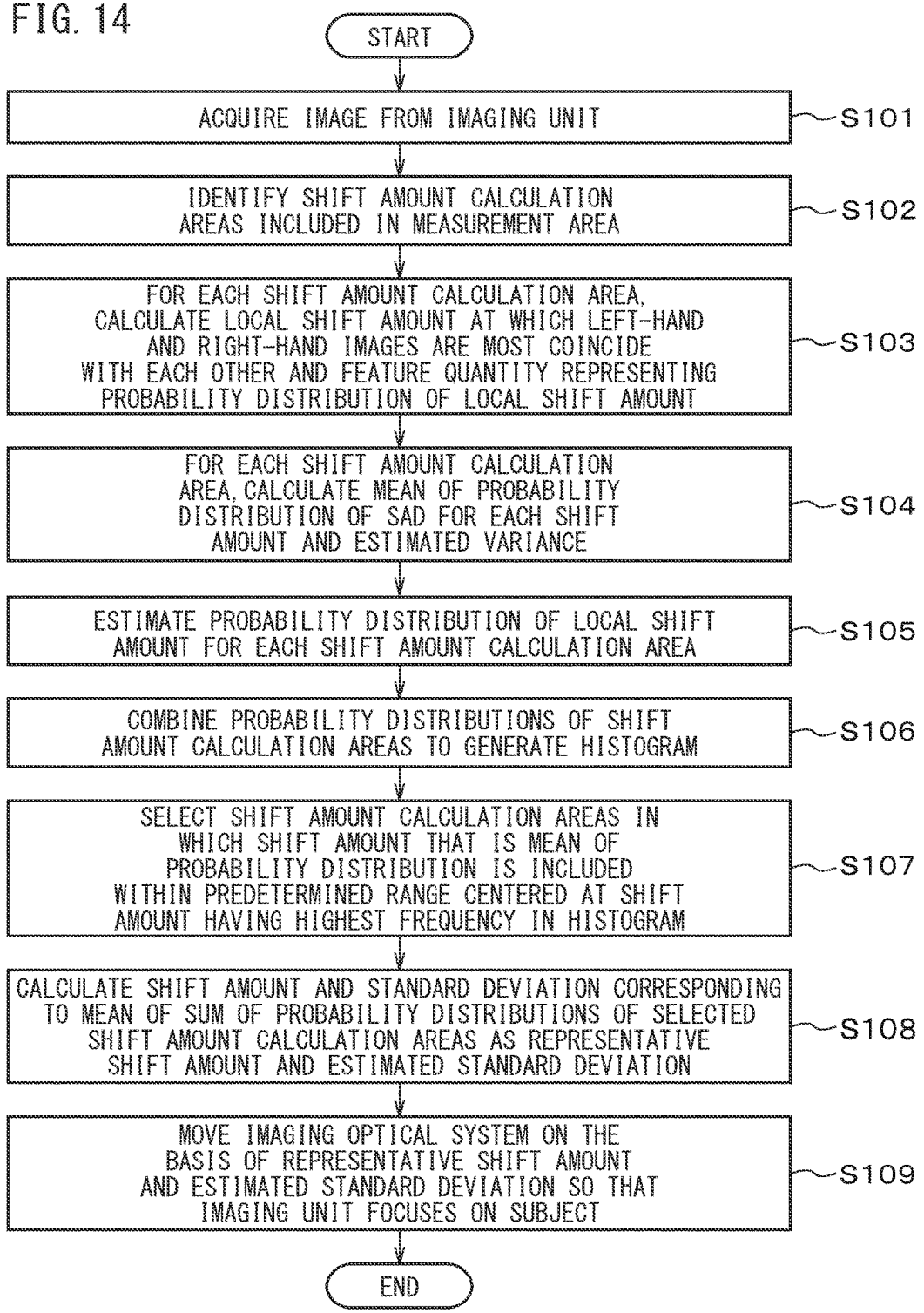

FOCUS POSITION DETECTION DEVICE AND FOCUS POSITION DETECTION METHOD

CROSS-REFERENCE TO RELATED APPLICATION

This application is based upon and claims the benefit of priority of the prior Japanese Patent Application No. 2015-039505, filed on Feb. 27, 2015, and the entire contents of which are incorporated herein by reference.

FIELD

The embodiments discussed herein are related to a focus position detection device and a focus position detection method that detect a focus position for a subject on the basis of an image captured by imaging the subject.

BACKGROUND

Devices that images subjects, such as digital cameras or video cameras, have incorporated techniques that automatically measure the distance to a subject and focus on the subject on the basis of the result of the measurement (so-called autofocus) in order to generate a sharp image of the subject.

Among such autofocus (AF) methods, a phase difference detection method is known as an example of a method that uses light beams passing through an imaging optical system. In the phase difference detection method, a light beam coming from a subject and passing through the imaging optical system is split into two and a displacement of an image sensor from a focus position is determined from the distance between the locations of images of the subject produced by the two light beams on the image sensor. Then the focal point position of the imaging optical system is adjusted so that the locations of the images of the subject produced by the two light beams coincide with each other. In the phase difference detection method, for example, an area where a focus position can be detected by the phase difference detection method is set on the image sensor. Half of each of condenser lenses that is provided on the front of a plurality of solid-state imaging elements arranged in one row included in the area, and perpendicular to the direction in which the solid-state imaging elements are arranged is masked to obtain an image of the subject that corresponds to one of the light beams. Similarly, the other half of each of the condenser lenses that is provided on the front of the plurality of solid-state imaging elements arranged in the other row included in the area, and perpendicular to the direction in which the sold-state imaging elements are arranged is masked to obtain an image of the subject that corresponds to the other of the light beams.

A technique has been proposed that provides a plurality of such areas on an image sensor to enable AF using a phase difference detection method in a plurality of locations in the image sensor (for example, see Japanese Laid-open Patent Publication No. 2007-24941). In the technique disclosed in Japanese Laid-open Patent Publication No. 2007-24941, when a focus position in an area of interest in which focal point detection using the phase difference detection method may not be performed on the image sensor is to be detected, a defocus amount is obtained in each of a plurality of areas, which is near the area of interest and in which focal point detection using the phase difference detection method can be performed. Then the average of the obtained defocus amounts is used as an estimated defocus amount in the area of interest.

SUMMARY

However, a large amount of noise may be contained in an image of a subject obtained in each area. In such a case, using defocus amounts in a plurality of areas, i.e., the average of the amounts of displacement of the image sensor from a focus position as an estimated defocus amount of the area of interest, may result in a large amount of error in the estimated defocus amount due to the influence of the noise. In addition, different subjects may appear in different areas and different areas may have different distances from an imaging optical system to the subjects. In such a case, an estimated defocus amount may be different from defocus amounts for any of the subjects and the camera may not focus on any of the subjects even when the focal point position of the imaging optical system is adjusted on the basis of the estimated defocus amount.

According to one embodiment, a focus position detection device is provided. The focus position detection device includes a processor configured to identify a plurality of shift amount calculation areas included in a measurement area set on an image sensor in an imaging unit including the image sensor which generates an image and an optical system, each of the plurality of shift amount calculation areas generates a first sub-image and a second sub-image which represent a subject appearing in the shift amount calculation area, wherein a shift amount between the subject on the first sub-image and the subject on the second sub-image changes in accordance with a distance between a focus position at which the subject is brought into focus by the optical system and the image sensor; calculate, for each of the plurality of shift amount calculation areas, a local shift amount of the second sub-image with respect to the first sub-image when the subject on the first sub-image and the subject on the second sub-image are most coincident with each other; calculate, for each of the plurality of shift amount calculation areas, a feature quantity representing a probability distribution representing accuracy of the local shift amount; estimate, for each of the plurality of shift amount calculation areas, the probability distribution representing accuracy of the local shift amount on the basis of the local shift amount and the feature quantity; combine the probability distributions representing accuracy of the local shift amount for the plurality of shift amount calculation areas to obtain a distribution of accuracy of the local shift amount for the measurement area; and calculate a representative value representing a distance between a focus position produced by the optical system with respect to the subject appearing in the measurement area and the image sensor on the basis of the distribution.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a relationship between a measurement area and shift amount calculation areas.

FIG. 6A is a diagram illustrating a principle of equiangular linear fitting.

FIG. 6B is a diagram illustrating the principle of equiangular linear fitting.

FIG. 7A is a diagram illustrating examples of a mean and standard deviation of SAD when a Gaussian noise is superimposed on a left-hand image and a right-hand image.

FIG. 7B is a diagram illustrating examples of a mean and standard deviation of SAD when a Gaussian noise is superimposed on a left-hand image and a right-hand image.

FIG. 8A is a diagram illustrating graphs of probability of local shift amount obtained from the relationship between shift amount and SAD when Gaussian noise is superimposed on the left-hand image and the right-hand image illustrated in FIG. 7A.

FIG. 8B is a diagram illustrating graphs of probability of local shift amount obtained from the relationship between shift amount and SAD when Gaussian noise is superimposed on the left-hand image and the right-hand image illustrated in FIG. 7B.

FIG. 9 is a diagram illustrating an overview of a process for estimating a probability distribution of a local shift amount.

FIG. 14 is an operation flowchart of a process for detecting a focus position.

DESCRIPTION OF EMBODIMENTS

A focus position detection device according to one embodiment will be described with reference to the drawings. The focus position detection device obtains a focus position in an entire measurement area on the basis of a shift amount between two images of a subject in each of a plurality of areas included in the measurement area, on an image sensor, in each of which a focus position can be detected using phase different detection. In this regard, the focus position detection device estimates a probability distribution representing accuracy of a shift amount for each area and obtains a focus position of the entire measurement area on the basis of a result of combining the probability distributions in the areas.

For convenience of explanation, an area in which a focus position can be detected using phase difference detection will be referred to as an AF area.

Figure 1:
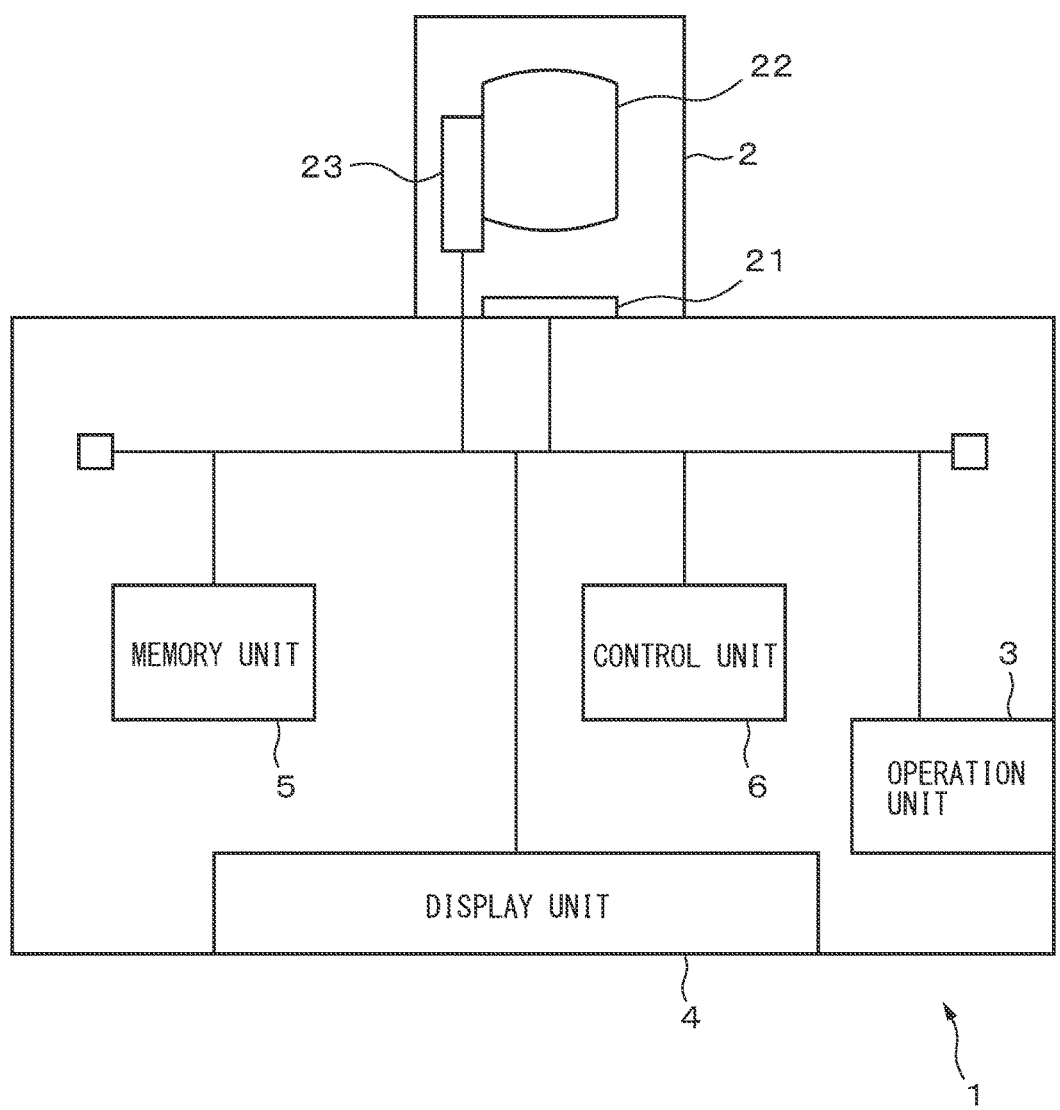
FIG. 1 is a schematic block diagram of a digital camera, which is an example of imaging apparatus incorporating a focus position detection device.

FIG. 1 is a schematic configuration diagram illustrating a digital camera, which is an example of an imaging apparatus incorporating a focus position detection device. As illustrated in FIG. 1, the digital camera 1 includes an imaging unit 2, an operation unit 3, a display unit 4, a memory unit 5 and a control unit 6. The digital camera 1 may further include an interface circuit (not depicted) conforming to a serial bus standard such as Universal Serial Bus for connecting the digital camera 1 to a computer or other apparatuses such as a television set. The control unit 6 is connected to other units of the digital camera 1 through a bus, for example. Note that the focus position detection device is applicable to various apparatuses that include an imaging unit.

The imaging unit 2 includes an image sensor 21, an imaging optical system 22, and an actuator 23. The image sensor 21 includes an array of solid-state imaging elements arranged in a two-dimensional array and generates an image. A microlens, for example, for condensing light is provided on the front of each of the solid-state imaging elements. A plurality of AF areas are provided in the image sensor 21. The imaging optical system 22 is provided in front of the image sensor 21, includes one or more lenses arranged along the optical axis, for example, and forms an image of a subject on the image sensor 21 in focus. The actuator 23 includes a stepping motor, for example, and causes the stepping motor to rotate by an amount of rotation according to a control signal from the control unit 6 to move some or all of the lenses of the imaging optical system 22 along the optical axis, thereby adjusting a focus position. Each time the imaging unit 2 generates an image in which a subject is captured, the imaging unit 2 sends the generated image to the control unit 6.

Figure 2:
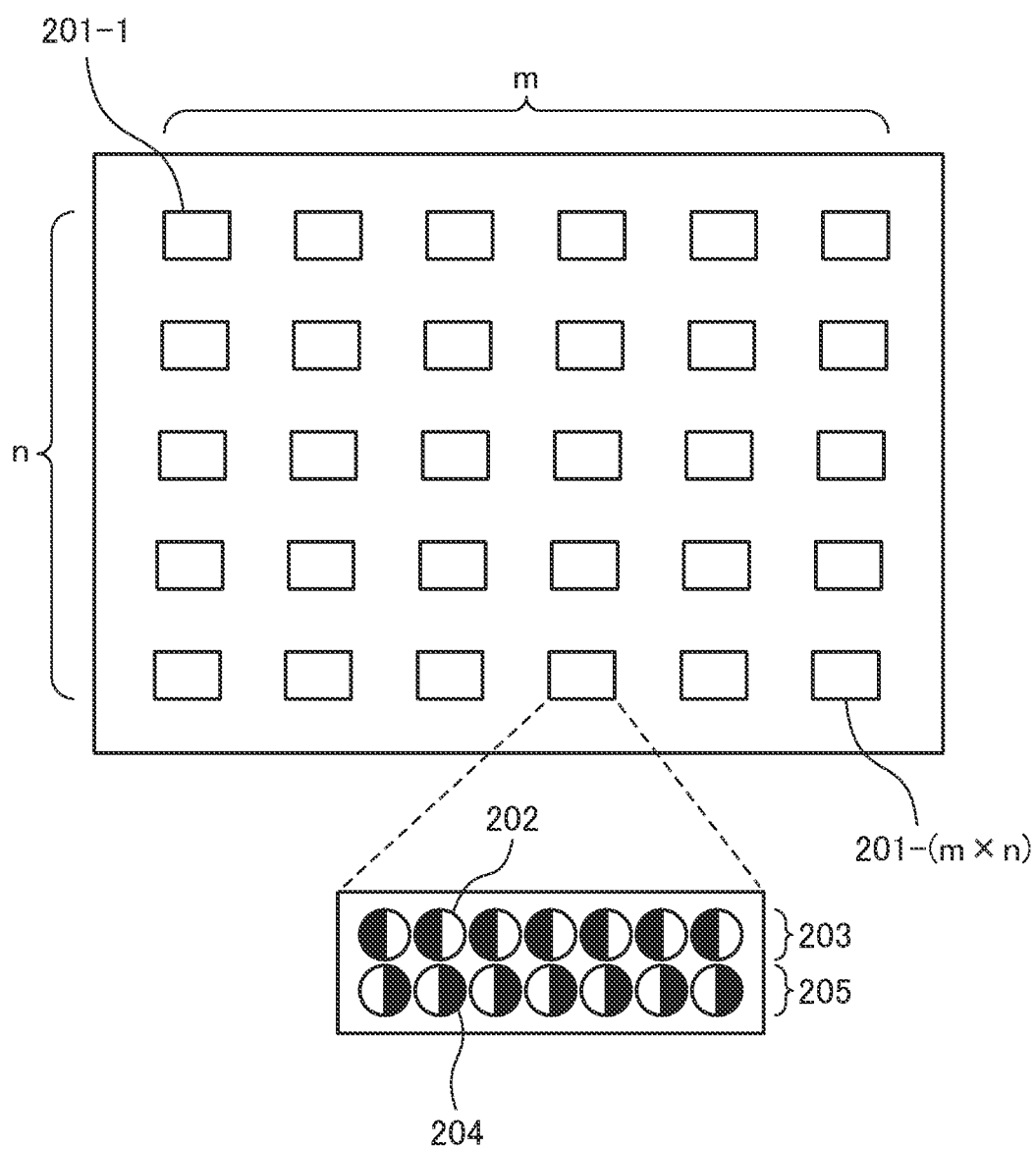
FIG. 2 is a diagram illustrating an example of an AP area provided on an image sensor.

FIG. 2 is a diagram illustrating an example of AF areas provided on the image sensor 21. In this example, m (in the horizontal direction)×n (in the vertical direction) AF areas 201-1 to 201-($m \times n$) are provided in an imaging region 200 in which the image sensor 21 generates an image (where $m \geq 1$, $n \geq 1$). Each of the AF areas includes, for example, a pixel row 203 in which a plurality of solid-state imaging elements 202 a left half of a light receiving surface of each of which are masked are arranged in the horizontal direction behind the microlens and a pixel row 205 in which a plurality of solid-state imaging elements 204 a right half of a light receiving surface of each of which are masked are arranged in the horizontal direction behind the microlens.

Figure 3:
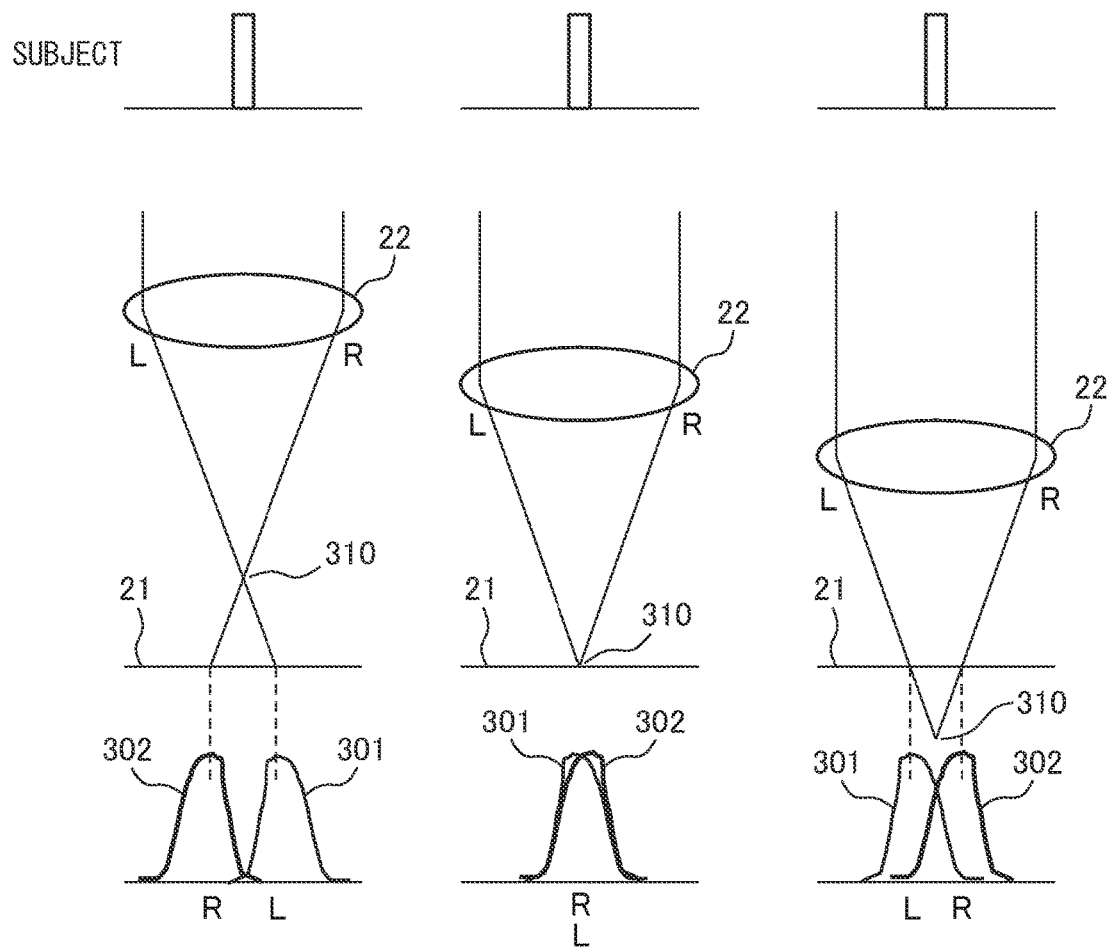
FIG. 3 is a diagram illustrating an example of sub-images generated by two pixel rows in the AF area illustrated in FIG. 2.

FIG. 3 is a diagram illustrating an example of sub-images generated by the two pixel rows in an AF area illustrated in FIG. 2. In the following description, a sub-image generated by the pixel row 203 will be referred to as a left-hand image 301 for convenience and a sub-image generated by the pixel row 205 will be referred to as a right-hand image 302 for convenience. The left-hand image 301 and the right-hand image 302 are substantially coincident with each other when a focus position 310 for a subject appearing in the AF area produced by the imaging optical system 22 is on the image sensor 21. However, when the focus position 310 produced by the imaging optical system 22 is closer to the subject than the image sensor 21, i.e., when the focus position 310 is in front of the image sensor 21, the left-hand image 301 shifts to the right from a location where the left-hand image 301 appears when the subject is in focus. On the other hand, the right-hand image 302 shifts to the left from a location where the right-hand image 302 appears when the subject is in focus. Conversely, when the focus position 310 produced by the imaging optical system 22 is away from the subject than the image sensor 21, i.e., when the focus position 310 is on the back of the image sensor 21, the left-hand image 301 shifts to the left from a location where the left-hand image 301 appears when the subject is in focus. On the other hand, the right-hand image 302 shifts to the right from a location where the right-hand image 302 appears when the subject is in focus. Therefore when the degree of coincidence between the left-hand image 301 and the right-hand image 302 is measured while one of the left-hand image 301 and the right-hand image 302 is shifted in the horizontal direction with respect to the other, the amount of the shift when left-hand image 301 and the right-hand image 302 are most coincident with each other represents the amount of displacement of the image sensor 21 from the focus position. Accordingly, by moving the imaging optical system 22 so that the amount of shift reaches 0, the control unit 6 can cause the imaging unit 2 to focus on the subject.

The operation unit 3 includes, for example, various operation buttons or a dial switch used by a user to operate the digital camera 1. The operation unit 3 sends a control signal for starting imaging or focusing or a setting signal for setting a shutter speed or aperture to the control unit 6 in response to a user operation.

The operation unit 3 also sends information representing an area in which the focus position of the imaging unit 2 in an imaging region is to be detected (hereinafter referred to as a measurement area for convenience) to the control unit 6 in response to a user operation. A plurality of measurement areas, such as the center, upper left, lower right of an imaging region and the entire imaging region are preset and the user selects one of the measurement areas by operating on the operation unit 3. Alternatively, a measurement area may be set in an arbitrary location within an imaging region.

The display unit 4 includes, for example, a display device such as a liquid-crystal display and displays various kinds of information received from the control unit 6 or images generated by the imaging unit 2. Note that the operation unit 3 and the display unit 4 may be integrated into one unit using a touch panel display, for example.

The memory unit 5 includes, for example, readable and writable volatile or nonvolatile semiconductor memory circuitry. The memory unit 5 stores images received from the imaging unit 2. The memory unit 5 also stores various kinds of data to be used by the control unit 6 for detecting a focus position. As such data, the memory unit 5 stores, for example, information representing the location and range of each AP area (for example the coordinates of the upper left corner and the lower right corner of each AP area on an image generated by the imaging unit 2), identification information of each AF area, and the like. In addition, the memory unit 5 stores a focal point position table used for adjustment of the focal, point position of the imaging optical system 22. The focal point position table indicates a relationship between a shift amount corresponding to the distance from the imaging unit 2 to a subject when the imaging optical system 22 is at a reference position and an amount of rotation of the stepping motor, which corresponds to the amount of movement of the imaging optical system 22 for causing the imaging optical system 22 to focus on a subject at the distance. For example, the reference position of the imaging optical system 22 may correspond to the position of the imaging optical system 22 when the imaging optical system 22 focuses on infinity. When the functions of the control unit 6 are implemented by a computer program executed on a processor of the control unit 6, the memory unit 5 may store the computer program.

The control unit 6 is an example of a focus position detection device and includes at least one processor and its peripheral circuitry. The control unit 6 controls the entire digital camera 1. Further, the control unit 6 detects a focus position on the basis of an image received from the imaging unit 2 and adjusts the focus position of the imaging optical system 22 on the basis of the detected focus position.

Figure 4:
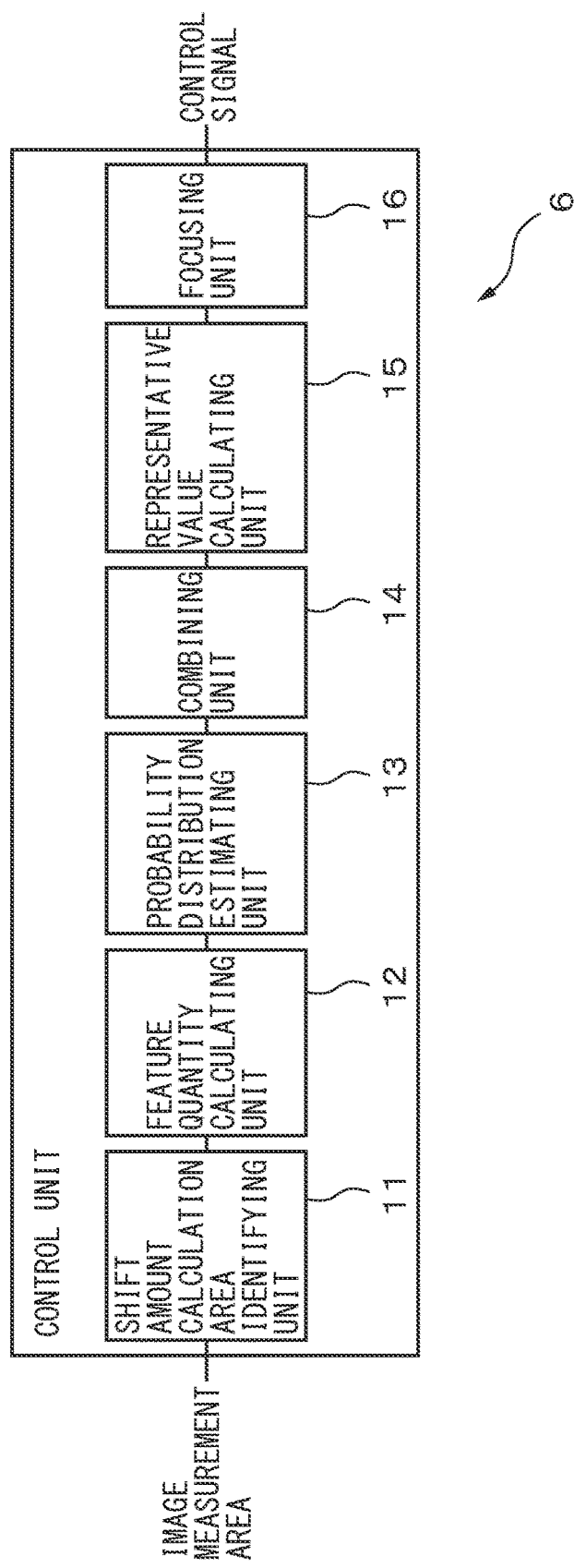
FIG. 4 is a functional block diagram of a control unit relating to detection of focus position.

FIG. 4 is a functional block diagram of the control unit 6, illustrating functional blocks that relate to focus position detection. The control unit 6 includes a shift amount calculation area identifying unit 11, a feature quantity calculating unit 12, a probability distribution estimating unit 13, a combining unit 14, a representative value calculating unit 15, and a focusing unit 16. These units of the control unit 6 are implemented, for example, as function modules implemented by a computer program executed on the processor of the control unit 6. Alternatively, one or more integrated circuits that implement the functions of the units of the control unit 6 may be incorporated in the digital camera 1 separately from the control unit 6.

The shift amount calculation area identifying unit 11 identifies AF areas included in a measurement area selected or set by the user on the image sensor 21 as shift amount calculation areas. In this regard, the shift amount calculation area identifying unit 11 retrieves information indicating the locations and ranges of the AF areas from the memory unit 5. The shift amount calculation area identifying unit 11 may then refer to the information indicating the locations and ranges of the AF areas to identify AF areas that at least partially overlap a measurement area as shift amount calculation areas. Alternatively, the shift amount identifying unit 11 may identify AF areas that are completely included in a measurement area as shift amount calculation areas.

FIG. 5 is a diagram illustrating an example of a relationship between a measurement area and shift amount calculation areas. In this example, twelve AP areas 510-1 to 510-12 are included in a measurement area 501 set in an imaging region 500 in which an image is generated by the image sensor 21. Accordingly, each of the AF areas 510-1 to 510-12 is identified as a shift amount calculation area.

The shift amount calculation area identifying unit 11 provides identification information of each AF area identified as the shift amount calculation area to the feature quantity calculating unit 12.

The feature quantity calculating unit 12 calculates, for each shift amount calculation area identified by identification information of an AP area provided by the shift amount calculation area identifying unit 11, a shift amount when a left-hand image and a right-hand image are most coincident with each other and a feature quantity representing a probability distribution representing the accuracy of the shift amount.

Calculation of a shift amount in each shift amount calculation area when a left-hand image and a right-hand image are most coincident with each other (hereinafter referred to as a local shift amount for convenience) will be described first.

The feature quantity calculating unit 12 calculates, for example, the sum of absolute differences (SAD) between pixel values of corresponding pixels while shifting a right-hand image with respect to a left-hand image pixel by pixel. The feature quantity calculating unit 12 sets the shift amounts of right-hand image with respect to a left-hand image when the SAD value is minimum, as the local shift amount.

The feature quantity calculating unit 12 can calculate SAD(s) for a shift amount s for each shift amount calculation area in accordance with the equation given below, for example.

$$SAD[s] = \sum_{n=0}^{N-1} |R[n+s+S] - L[n+S]| \quad (-S \le s \le S) \quad (1)$$

where N represents the number of pixels in a left-hand image and a right-hand image used for one SAD calculation. +S to −S represents a range of shift amounts from which a local shift amount is to be found. L[n] and R[n] represent values of n-th pixels in the left-hand image and the right-hand image, respectively.

In equation (1), a local shift amount is calculated on a pixel-by-pixel basis. In reality, however, the local shift amount at which the SAD value is minimum is not necessarily in pixels. The feature quantity calculating unit 12 therefore obtains a local shift amount on a subpixel-by-subpixel basis by equiangular linear fitting using a shift amount at which the SAD value is minimum and SAD values for shift amounts around the shift amount obtained in accordance with equation (1).

FIGS. 6A and 6B are diagrams illustrating a principle of the equiangular linear fitting. In FIGS. 6A and 6B, the horizontal axis represents shift amount and the vertical axis represents SAD value. b represents the minimum value of SAD calculated in accordance with equation (1), a represents a SAD value when the shift amount is smaller than the shift amount corresponding to the minimum SAD value by one pixel, and c represents a SAD value when the shift amount is greater than the shift amount corresponding to the minimum SAD value by one pixel. In the equiangular linear fitting, it is assumed that the gradient of increase of the SAD value when the shift amount is decreasing from a local shift amount is equal to the gradient of increase of the SAD value when the shift amount is increasing.

Therefore, a line 601 that passes through a point corresponding to the minimum SAD value b and a point corresponding to an adjacent point a or c, whichever corresponds to a greater SAD value, i.e., line ab or line bc, whichever has a greater absolute value of gradient is obtained. When a>c as illustrated in FIG. 6A, the line 601 is line ab; on the other hand, when a≤c as illustrated in FIG. 6B, the line 601 is line bc. Additionally, a line 602 that passes through a or c, whichever corresponds a smaller SAD value, and that has a gradient opposite to the line 601 (i.e., a gradient with the reverse sign) is obtained. The shift amount that corresponds to the intersection between the line 601 and the line 602 is the local shift amount sh on a subpixel-by-subpixel basis.

The feature quantity calculating unit 12 can calculate the local shift amount sh using equiangular linear fitting in accordance with the equation given below.

$$sh = \begin{cases} s_{min} + 0.5 \times (c-a)/(b-a) & \text{(when } a > c\text{)} \\ s_{min} + 0.5 \times (c-a)/(b-c) & \text{(when } a \le c\text{)} \end{cases} \quad (2)$$

where $s_{min}$ represents a shift amount on a pixel-by-pixel basis at which the SAD value is minimum; and a=SAD $[s_{min}-1]$, b=SAD$[s_{min}]$, and c=SAD $[s_{min}+1]$.

When values of the pixels making up the left-hand image or the right-hand image do not include a noise component, the local shift amount sh calculated as described above may be a relatively accurate value. However, when the subject is dark, for example, the degree of the contribution of a noise component to values of the pixels making up the left-hand image or the right-hand image will be great. In such a case, the local shift amount sh obtained is not necessarily accurate.

Therefore after calculating the local shift amount sh for each shift amount calculation area, the feature quantity calculating unit 12 calculates a feature quantity that represents a probability distribution representing the accuracy of the local shift amount sh.

A probability distribution representing the accuracy of a local shift amount sh (hereinafter simply referred to as the probability distribution of a local shift amount) will be described first.

Let $u_{ij}$ denote the absolute difference between a pixel value L[i] of an i-th pixel of the left-hand image and a pixel value R[j] of a j-th pixel of the left-hand image. Then the probability density function $f_{ij}(x_{ij})$ of an absolute difference $x_{ij}$ between corresponding pixels when Gaussian noise having a standard deviation $\sigma/\sqrt{2}$ is superimposed on each of the left-hand and right-hand images can be written as:

$$f_{ij} = (x_{ij}) = \qquad (3)$$

$$\begin{cases} \frac{1}{\sqrt{2\pi\sigma^2}} \left( \exp\left(-\frac{(x_{ij}-u_{ij})^2}{2\sigma^2}\right) + \exp\left(-\frac{(-x_{ij}-u_{ij})^2}{2\sigma^2}\right) \right) & \text{(when } x_{ij} \ge 0\text{)} \\ 0 & \text{(when } x_{ij} < 0\text{)} \end{cases}$$

In other words, $f_{ij}(x_{ij})$ has a distribution, in a normal distribution with mean $u_{ij}$ and standard deviation $\sigma$, where a range of $x_{ij}$ that take negative values are inverted to positive. The second term of the right-hand side of equation (3) corresponds to the range where $x_{ij}$ that take negative values are inverted to positive in the normal distribution with mean $u_{ij}$ and standard deviation $\sigma$.

Mean e[i][j] and variance v[i][j] of $f_{ij}(x_{ij})$ can be calculated by integral calculation using the distribution in equation (3) as $$e[i][j] = \sqrt{\frac{2}{\pi}} \sigma \cdot \exp\left(-\frac{u_{ij}^2}{2\sigma^2}\right) + u_{ij} \cdot erf\left(\frac{u_{ij}}{\sqrt{2\sigma^2}}\right) \quad (4)$$

$$v[i][j] = (u_{ij}^2 + \sigma^2) - (e[i][j])^2 \quad (5)$$

erf (•) in equation (4) is an error function, which is defined as $$erf(x) = \frac{2}{\sqrt{\pi}} \int_0^x \exp(-t^2) dt \quad (6)$$

A probability density function $g_s(x_s)$ of a SAD value $x_s$ that corresponds to a shift amount s corresponds to a probability distribution of the sum of absolute differences $x_{ij}$ between pixels L[i] of the left-hand image and pixels R[j] of the right-hand image and can be calculated by convolution integral expressed by the following equation.

$$g_s(x_s) = ((\cdots ((f_{(s+S)S} * f_{(1+s+S)(1+S)}) * f_{(2+s+S)(2+S)}) \cdots ) * f_{(N-1+s+S)(N-1+S)})(x_s) \quad (7)$$

where the symbol of operation '*' represents the convolution integral of two functions and can be defined as $$(f*g)(x) = \int_{-\infty}^{\infty} f(t)g(x-t)dx \quad (8)$$

Mean E[s] and variance V[s] of the probability density function $g_s(x_s)$ can be written as $$E[s] = \sum_{n=0}^{N-1} e[n+s+S][n+S] \quad (9)$$

$$V[s] = \sum_{n=0}^{N-1} v[n+s+S][n+S] + K \quad (10)$$

The constant K, which is the second term of the right-hand side of equation (10), is a term relating to the covariance of N random variables added in the first term and, when all of the N random variables are independent of one another, K is 0. On the other hand, when at least one pair of random variables that are not independent are included in the N random variables, K takes a non-zero value. For example, when preprocessing such as smoothing filtering is performed for the left-hand image and the right-hand image before the SAD calculation, the pixel values of adjacent pixels in the image correlate one another and, as a result, the absolute differences between adjacent pixels also correlated. Accordingly, K takes a positive value. On the other hand, preprocessing is not performed on the left-hand image and the right-hand image, absolute differences are independent of one another and therefore K is 0.

FIGS. 7A and 7B illustrate examples of means and standard deviations of SAD when Gaussian noise is superimposed on a left-hand image and a right-hand image. In the graphs at the top of FIGS. 7A and 7B, the horizontal axis represents the coordinates of pixels and the vertical axis represents pixel values. An input pattern 701 illustrated in FIG. 7A represents values of individual pixels of a subject represented in the left-hand image and the right-hand image. Similarly, an input pattern 702 illustrated in FIG. 7B represents values of individual pixels of the subject represented in the left-hand image and the right-hand image. The contrast in the input pattern 702 illustrated in FIG. 7B is ½ of the contrast of the input pattern 701 illustrated in FIG. 7A. In both of FIGS. 7A and 7B, it is assumed that the input patterns of the left-hand and right-hand images are the same and there is no phase difference between the left-hand and right-hand images (i.e., the local shift amount sh is 0).

In graphs at the bottom of FIGS. 7A and 7B, the horizontal axis represents shift amounts s when SAD values are calculated and the vertical axis represents the SAD values. A graph 711 illustrated in FIG. 7A represents the relationship between shift amount and SAD when noise is not superimposed on the left-hand and right-hand images, which corresponds to the input pattern 701 when N=32 in equation (1). A graph 721 represents the relationship between shift amount and mean (=E[s]) of SAD values when Gaussian noise with a standard deviation σ of 12.5 is added to the input pattern 701. An error bar 731 depicted for each shift amount represents a standard deviation (the square root of V[s]) of the SAD value at the shift amount when Gaussian noise with a standard deviation σ of 12.5 is added to the input pattern 701. Similarly, a graph 712 illustrated in FIG. 7B represents the relationship between shift amount and SAD value when noise is not superimposed on the left-hand and right-hand images, which corresponds to the input pattern 702. A graph 722 represents the relationship between shift amount and the mean of SAD values when Gaussian noise with a standard deviation σ of 12.5 is added to the input pattern 702 when N=32 in equation (1). An error bar 732 depicted for each shift amount represents a standard deviation of the SAD value at the shift amount when Gaussian noise with a standard σ deviation of 12.5 is added to the input pattern 702.

As illustrated in FIGS. 7A and 7B, when noise is superimposed on the left-hand and right-hand images, the mean of SAD generally increases at each shift amount and the SAD values vary to some extent. As the contrast of the input patterns decreases, the rate of change in the SAD value with respect to change in the shift amount s decreases and it becomes likely that error in an obtained local shift amount sh increases.

When the probability distribution of a SAD value $x_s$ that corresponds to each shift amount s is found, the probability distribution of a local shift amount can be estimated. A method for estimating the probability distribution of a local shift amount will be described below.

For simplicity, it is assumed that the shift amount s that corresponds to the minimum value of SAD $x_s$ obtained on a pixel-by-pixel basis is a local shift amount sh (i.e., the local shift amount is not calculated down to the subpixel level). In this case, the probability distribution of the local shift amount sh can be determined by obtaining the probability of the SAD value being minimum at each shift amount.

When the SAD value $x_s$ at a given shift amount s is the minimum SAD value, SAD values at any shift amounts other than the shift amount s are greater than $x_s$. Therefore, the probability distribution of the local shift amount sh can be obtained by obtaining, for each shift amount, the probability that the SAD value at the shift amount will be minimum and adding the probabilities together.

Cumulative probability $G_s(X_s)$ of the probability density function $g_s(x_s)$ of the SAD value $x_s$ at a shift amount s can be defined as $$G_s(x_s) = \int_{-\infty}^{\infty} g_s(t)dt \quad (11)$$

The probability that the SAD value at a given shift amount i will be greater than $x_s$ is the complementary event of equation (11), i.e., $\{1-G_i(x_s)\}$. Therefore the probability h(s) that the SAD value at a given shift amount s will be minimum, i.e, the probability h(s) of the shift amount s being a local shift amount sh can be calculated in accordance with the following equation.

$$h(s) = \int_{-\infty}^{\infty} \prod_{i=-S, i \neq s}^{S} (1 - G_i(x_s)) \cdot g_s(x_s) dx_s \quad (12)$$

FIGS. 8A and 8B illustrate graphs of probabilities h(s) obtained from the relationship between shift amount and SAD value in accordance with the equations given above in the example where Gaussian noise with a standard deviation σ of 12.5 is superimposed on the left-hand and right-hand images, illustrated in FIGS. 7A and 7B. In FIGS. 8A and 88B, the horizontal axis represents shift amount and the vertical axis represents probability. A probability distribution 801 illustrated in FIG. 8A can be obtained from the relationship between shift amount and the mean of SAD values and the standard deviations of the SAD values, which correspond to the input pattern 701 in FIG. 7A and are illustrated by the graph 721 and the error bars 731. On the other hand, a probability distribution 802 illustrated in FIG. 8B can be obtained from the relationship between shift amount and the mean of SAD values and the standard deviations of the SAD values, which correspond to the input pattern 702 in FIG. 7B and are represented by the graph 722 and the error bars 733. In these examples, h(s) is obtained on the assumption that means and variance of the probability density function $g_s(x_s)$ are in accordance with E(s) and the normal distribution of V[s], respectively.

As described above, when the shape of an input pattern on which noise is not superimposed, i.e., a distribution profile of pixel values that corresponds to a subject and characteristics of noise superimposed on left-hand and right-hand images are known, the provability distribution of a local shift amount can be derived. However, when a local shift amount is obtained from left-hand and right-hand images acquired in practice, these items of information are unknown. The feature quantity calculating unit 12 therefore calculates a feature quantity that represents the probability distribution of a local shift amount from left-hand and right-hand images in each shift amount calculation area so that the probability distribution estimating unit 13 can estimate the probability distribution.

Feature quantities representing the probability distribution of a local shift amount will be described below. As described above, the probability distribution of a local shift amount can be estimated to some extent when the variance (or the standard deviation) of the probability distribution of a SAD value at each shift amount and the rate of change in the mean of SAD values with respect to change in the shift amount are known. Therefore the feature quantity calculating unit 12 in this embodiment calculates feature quantities that can be used to estimate the variance of the probability distribution of a SAD value and the rate of change in the mean of the SAD values with respect to change in the shift amount as feature quantities representing the probability distribution of a local shift amount.

To estimate the variance of the probability distribution of a SAD value in a simple manner, the minimum value SAD[$s_{min}$] of SAD[s] obtained in accordance with equation (1) can be used. Assume that a shift amount $S_{min}$ at which SAD[s] is minimum is an accurate local shift amount with no error (hereinafter denoted as $s_{opt}$ for convenience). In this case, under a condition in which noise is not superimposed on pixel values, the pixel values of the right-hand image are completely identical to the corresponding pixel values of the left-hand image when the right-hand image is shifted by the local shift amount $s_{opt}$ with respect to the left-hand image. In other words, all of the absolute differences $u_{ij}$ between the pixel values of the corresponding pixels are 0 in the right-hand side of equations (9) and (10) and equations (9) and (10) can be rewritten as follows:

$$E[s_{opt}] = N\sigma\sqrt{\frac{2}{\pi}} \quad (13)$$

$$v[s_{opt}] = N\sigma^2\left(1 - \frac{2}{\pi}\right) \quad (14)$$

E[$S_{opt}$] represents the mean of SAD at the shift amount $s_{opt}$ with no error and V[$s_{opt}$] is its variance. From equations (13) and (14), the following relationship can be obtained.

$$V[s_{opt}] = \frac{E[s_{opt}]^2}{N}\left(\frac{\pi}{2} - 1\right) \quad (15)$$

It can be seen from equation (15) that the variance increases as the mean of SAD values increases. Accordingly, the variance of SAD values can be estimated from the minimum value [$S_{min}$] of SAD. In reality, there is a difference between the shift amount $S_{min}$ at which the SAD value is minimum and an accurate local shift amount $S_{opt}$ and, in addition, the SAD[$s_{min}$] is stochastically variable. Accordingly, substituting SAD[$s_{min}$] for E[$s_{opt}$] in equation (15) does not necessarily obtain an accurate variance of SAD values. However, because there is a relationship between SAD[$s_{min}$] and E[$s_{opt}$], the variance of the probability distribution of a SAD value can be estimated from SAD[$s_{min}$], as will be described later. The feature quantity calculating unit 12 therefore uses SAD[$s_{min}$] as a feature quantity for estimating the variance of the probability distribution of a SAD value (a variance feature quantity).

As a modified example, the feature quantity calculating unit 12 may estimate, as the standard deviation σ of noise, the root-mean-square error (RMSE) between the pixel values of pixels of a filtered image obtained by multiplying a left-hand or right-hand image by a denoising filter such as a median filter and corresponding pixels of an original image. The feature quantity calculating unit 12 may use the standard deviation σ as a feature quantity for estimating the variance of the probability distribution of a SAD value. When the standard deviation σ of noise can be estimated, the variance of the probability distribution of the SAD value can be estimated from equation (14).

A feature quantity used for estimating the rate of change in the mean of SAD with respect to change in a shift amount will be described next.

It is assumed that an input pattern has the shape of a step function as illustrated in FIGS. 7A and 7B and the difference between the maximum pixel value and the minimum pixel value in left-hand and right-hand images, i.e., the contrast is u. In this case, the rate of change in the mean of SAD values with respect to change in a shift amount can be obtained from a difference, for example, between the mean E[$s_{opt}$] of SAD calculated by equation (13) and the mean E[$s_{opt}$+1] of SAD for a shift amount when shifted by 1 from the shift amount used in the calculation. When noise is not superimposed on the left-hand and right-hand images, the absolute difference between a pixel value of one pixel and its corresponding pixel will be u when the shift amount is shifted by 1 from the shift amount at which SAD is minimum. On the other hand, for the other pixels (N−1 pixels), the pixel values of pixels of the left-hand image are completely identical to the pixel values of the corresponding pixels of the right-hand image. Thus the absolute difference between the pixel values of the corresponding pixels is 0. Therefore by reflecting the relationship in equation (9), E[$s_{opt}$+1] can be written as $$E[s_{opt}+1] = \sigma\sqrt{\frac{2}{\pi}}\left((N-1) + \exp\left(-\frac{u^2}{2\sigma^2}\right)\right) + u \cdot erf\left(\frac{u}{\sqrt{2\sigma^2}}\right) \quad (16)$$

From equations (16) and (13), the rate of change in the mean of SAD values with respect to change in the shift amount can be written as:

$$E[s_{opt}+1] - E[s_{opt}] = \sigma\sqrt{\frac{2}{\pi}}\left(\exp\left(-\frac{u^2}{2\sigma^2}\right) - 1\right) + u \cdot erf\left(\frac{u}{\sqrt{2\sigma^2}}\right) \quad (17)$$

By differentiating partially the right-hand side of equation (17) with contrast u, the following equation can be obtained.

$$\frac{\partial (E[s_{opt}+1] - E[s_{opt}])}{\partial u} = erf\left(\frac{u}{\sqrt{2\sigma^2}}\right) \quad (18)$$

Because the argument of the error function erf in the right-hand side of equation (18) is always positive, the error function itself always takes a positive value. From this, it can be seen that the rate of change in the mean of SAD values with respect to change in the shift amount increases as the contrast of the pattern increases. The feature quantity calculating unit 12 therefore calculates the difference between the maximum pixel value and the minimum pixel value, i.e., the contrast, in the left-hand image or the right-hand image as a feature quantity representing the rate of change in the mean of SAD with respect to change in the shift amount (a mean feature quantity).

According to the modified example, instead of the contrast, the feature quantity calculating unit 12 may calculate the variance of pixel values of a left-hand image or a right-hand image as a feature quantity representing the rate of change in the mean of SAD values with respect to change in the shift amount.

According to another modified example, the feature quantity calculating unit 12 may calculate some or all of SAD[s] for individual shift amounts a calculated using equation (1) as a feature quantity representing the probability distribution of a local shift amount.

The feature quantity calculating unit 12 outputs the local shift amount sh and the feature quantity representing the probability distribution of the local shift amount sh for each shift amount calculation area to the probability distribution estimating unit 13.

The probability distribution estimating unit 13 estimates, for each shift amount calculation area, the probability distribution of a local shift amount sh on the basis of the local shift amount sh of the shift amount calculation area and the feature quantity representing the probability distribution of the local shift amount sh.

FIG. 9 is a diagram illustrating an overview of a process for estimating the probability distribution of a local shift amount sh. The probability distribution estimating unit 13 estimates the probability distribution 901 of a SAD value for each shift amount illustrated by an error bar in the left-hand part of FIG. 9 on the basis of a local shift amount sh and the feature quantity representing the probability distribution of the local shift amount sh. The probability distribution estimating unit 13 then estimates the probability distribution 902 of the local shift amount sh from the probability distribution 901 of a SAD value for each shift amount. Since the provability distribution estimating unit 13 performs simply the same process for each shift amount calculation area, the estimation process for one shift amount calculation area will be described below.

Estimation of the probability distribution of a SAD value for each shift amount will be described first. For simplicity, it is assumed in this embodiment that the variance of the probability distribution of SAD values is constant regardless of the shift amount and the mean of SAD values linearly changes with change in the shift amount.

First, estimation of the variance of the probability distribution of a SAD value will be described. The probability distribution estimating unit 13 can estimate the variance of the probability distribution of a SAD value on the basis of the minimum SAD value [$s_{min}$] in SAD values obtained by the feature quantity calculating unit 12. As descried above, the minimum SAD value [$s_{min}$] does not necessarily equal to the mean E[$s_{opt}$] of SAD at an accurate local shift amount $s_{opt}$ with no error but SAD[$s_{min}$] is stochastically smaller than B[$s_{opt}$]. Therefore, a correction coefficient k ($\geq 1$) such that E[$s_{opt}$]=k*SAD[$s_{min}$] holds is used to modify equation (15) as given below, and the probability distribution estimating unit 13 uses the modified equation to estimate the variance V of the probability distribution of a SAD value.

$$V = \frac{(k \cdot SAD[s_{min}])^2}{N}\left(\frac{\pi}{2} - 1\right) \quad (19)$$

In addition, the probability distribution estimating unit 13 uses the following equation established by modifying is equation (14) on the basis of the variance of the probability distribution of the SAD value to estimate the standard deviation σ of noise superimposed on the left-hand image and the right-hand image. The standard deviation σ is used for estimating the rate of change in the mean of SAD with respect to change in the shift amount.

$$\sigma = \sqrt{\frac{V}{N(1 - 2/\pi)}} \quad (20)$$

Further, when the standard deviation σ of noise has been obtained as a feature quantity that represents the variance of the probability distribution of a SAD value, the probability distribution estimating unit 13 can estimate the variance of the probability distribution of the SAD value by substituting the standard deviation σ into equation (14).

Estimation of the rate of change in the mean of SAD values with respect to change in shift amount will be described next. The probability distribution estimating unit 13 can estimate the rate of change in the mean of SAD values with respect to change in the shift amount by substituting the standard deviation σ of noise and contrast u into equation (17). Instead of the contrast, the variance of pixel values in a left-hand image or a right-hand image may have been obtained as a feature quantity. In that case, the variance v of a step function with contrast u is v=$u^2$/4. Expressed in another way, u=2$\sqrt{v}$, therefore the probability distribution estimating unit 13 can obtain the rate of change in the mean of SAD with respect to change in shift amount by substituting 2$\sqrt{v}$ for the value of u in equation (17).

Note that the correction coefficient k is not constant but varies with the rate of change in the mean of SAD with respect to change in the shift amount. Accordingly, the probability distribution estimating unit 13 may first use a preset initial value of the correction coefficient k to calculate variance V and may use the variance V to obtain the rate of change in the mean of SAD values with respect to change in the shift amount, then may update the correction coefficient k in accordance with the rate. The probability distribution estimating unit 13 may use the updated correction coefficient k to recalculate the variance V and use the recalculated variance to recalculate the rate of change in the mean of SAD with respect to change in the shift amount. The probability distribution estimating unit 13 can increase the accuracy of the estimation of the variance of the probability distribution of SAD and the rate of change in the mean of SAD with respect to the shift amount by repeating the process.

When some or all of SAD[s] for individual shift amounts s have been obtained as a feature quantity, the probability distribution estimating unit 13 can estimates the probability distribution of the SAD values by linearly approximating the obtained values of SAD[s].

Figure 10:
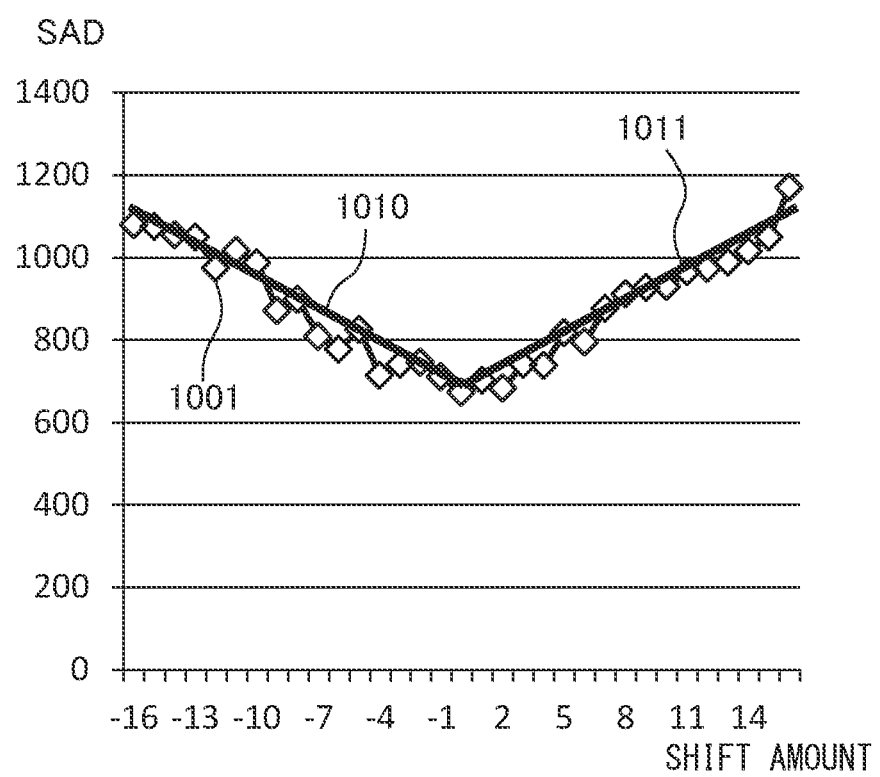
FIG. 10 is a diagram illustrating a relationship between shift amount and SAD obtained using linear approximation for a plurality of SAD(s) values.

FIG. 10 is a diagram illustrating a relationship between shift amount and SAD value, which can be obtained by linear approximation of a plurality of SAD[s] values. In FIG. 10, the horizontal axis represents the shift amount and the vertical axis represents the SAD value. Squares 1001 in FIG. 10 represent SAD values SAD[s] for shift amounts s obtained by the feature quantity calculating unit 12. In this case, the probability distribution estimating unit 13 may use an optimization method such as the method of least squares to linearly approximate SAD values to represent the relationship between the shift amount and SAD value as two lines 1010, 1011. In this case, the probability distribution estimating unit 13 can use the mean of the absolute values of the gradients of the two lines obtained by the linear approximation as the rate of change in the mean of the SAD values with respect to change in the shift amount. Further, the probability distribution estimating unit 13 can estimate the variance of the probability distribution of the SAD value by substituting the SAD value corresponding to the intersection of the two lines for $E[S_{opt}]$ in equation (15).

The probability distribution estimating unit 13 can estimate the mean E[s] of probability distributions of SAD for individual shift amounts s from $SAD[s_{min}]$ and the rate of change in the mean of the SAD values with respect to change in the shift amount. Because the variance of the probability distribution of SAD is constant regardless of the shift amount, the probability distribution estimating unit 13 can treat the variance V of the probability distribution of SAD calculated as described above as the variance V[s] of the probability distribution of individual shift amounts s. The probability distribution estimating unit 13 can obtain the probability distribution h(s) of the local shift amount sh in accordance with equation (12) on the basis of the mean E[s] and variance V[s] of the probability distributions of SAD values for individual shift amounts s. In this regard, the probability distribution estimating unit 13 assumes that the probability density function $g_s(x_s)$ of the SAD value is a normal distribution with the mean E[s] and variance V[s] of the probability distribution of SAD values for individual shift amounts s, for example.

Note that the amount of computation can be huge when the probability distribution estimating unit 13 calculates the probability distribution h(s) of a local shift amount sh for each shift amount calculation area in accordance with equation (12) each time the focus position detection process is performed. To deal with this, for example a table indicating probability distributions h(s) each of which corresponds to each combination of the variance of the probability distribution of SAD values and the rate of change in the mean of the SAD values with respect to change in shift amount may be stored in the memory unit 5 beforehand. In this case, since the probability distribution estimating unit 13 can obtain the probability distribution h(s) that corresponds to a combination of the variance of the probability distribution of SAD values and the rate of change in the mean of the SAD values with respect to change in the shift amount by referring to the tale, the amount of computation can be reduced.

The probability distribution estimating unit 13 outputs the probability distribution h(s) of the local shift amount sh for each shift amount calculation area to the combining unit 14.

The combining unit 14 generates a histogram representing a distribution of the accuracy of local shift amounts in an entire measurement area from the probability distributions h(s) of the local shift amounts sh of individual shift amount calculation areas.

For example, the combining unit 14 may add up the probability distributions h(s) of local shift amounts sh of shift amount calculation areas to generate a histogram. In this case, the combining unit 14 calculates the sum of probability values each of which is a local shift amount sh for each shift amount in accordance with the following equation as a frequency H(s) for shift amounts s.

$$H(s) = \sum_{i=1}^{M} h_i(s) \qquad (21)$$

where $h_i(s)$ represents the probability distribution of the local shift amount in an i-th shift amount calculation area in a measurement area in any order. M represents the total number of the shift amount calculation areas included in the measurement area.

Figure 11:
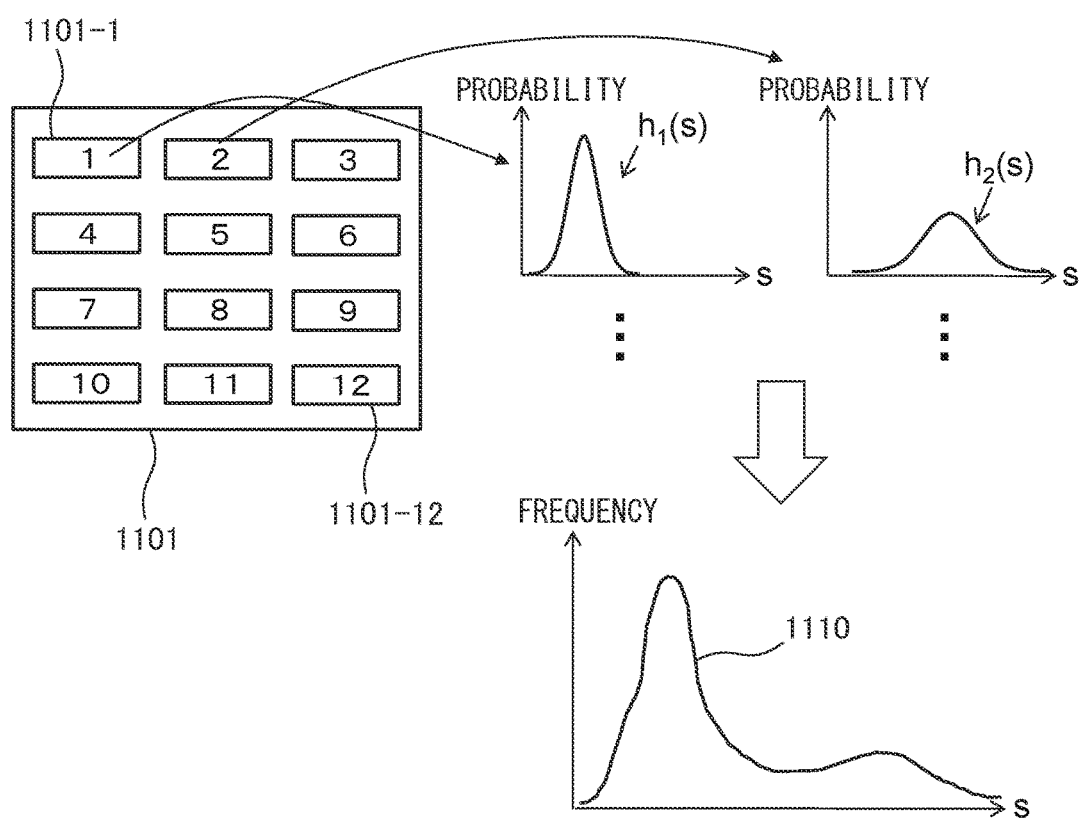
FIG. 11 is a diagram illustrating an example of a histogram to be combined with a probability distribution of local shift amounts in shift amount calculation areas in a measurement area.

FIG. 11 is a diagram illustrating an example of a histogram to be combined with a probability distribution of a local shift amount in each shift amount calculation area in a measurement area. In the example in FIG. 11, twelve shift amount calculation areas 1101-1 to 1101-12 are included in a measurement area 1100. Probability distributions $h_1(s)$ to $h_{12}(s)$ for local shift amounts in the shift amount calculation areas are obtained. Then, H(s) is calculated for individual shift amounts s in accordance with equation (21), thereby obtaining a histogram 1110 in which the probability distributions $h_1(s)$ to $h_{12}(s)$ of the local shift amounts are combined. In FIG. 11, the horizontal axis of the graph representing the histogram 1110 represents shift amount and the vertical axis represents frequency.

In a modified example, the combining unit 14 may represent the probability distribution $h_i(s)$ of the local shift amount in each shift amount calculation area by the average of $h_i(s)$, thereby reducing the amount of computation required for calculating the histogram.

In this case, the combining unit 14 assigns a weight $w_i$ to a shift amount $s_i$ that is the mean of probability distribution $h_i(s)$ of a local shift amount in each shift amount calculation area and assigns a weight of 0 to shift amounts other than the shift amount $s_i$. The combining unit 14 preferably assigns greater weights $w_i$ to shift amounts that have smaller variances of probability distributions $h_i(s)$. For example, the combining unit 14 may set the inverse of the variance of a probability distribution $h_i(s)$ as the weight $w_i$. In this way, the combining unit 14 makes it possible for shift amount calculation areas that have a smaller variance of probability distribution $h_i(s)$, i.e., shift amount calculation areas that are more likely to have an accurate local shift amount calculated to make a greater contribution to the histogram.

The combining unit 14 adds up the weights $w_i$ to generate a discrete histogram that discretely represents a distribution of the accuracy of local shift amounts for the entire measurement area. The combining unit 14 may multiply the generated discrete histogram by a smoothing filter with a certain width to obtain a histogram that represents a distribution of the accuracy of the local shift amounts for the entire measurement area. In this case, the frequency of each shift amount in the histogram is equal to the sum of weights $w_i$ at the shift amount.

The smoothing filter is used in order to minimize the difference between the discrete histogram and a histogram generated by adding up probability distributions $h_i(s)$. The combining unit 14 can use an averaging filter, for example, as the smoothing filter. In this case, the width (taps) of the filter is preferably set such that the trend of change in the sum of weights with respect to change in the shift amount is maintained. For example, the width (taps) of the filter can be obtained in accordance with the following equation.

$$\text{tap} = \frac{4}{M} \sum_{i=1}^{M} t_i \qquad (22)$$

where $t_i$ is the standard deviation of the probability distribution $h_i(s)$ of an i-th shift calculation area in the measurement area in any order.

The combining unit 14 may sets the width of the smoothing filter to a given multiple (for example quadruple) of the standard deviation of the probability distribution $h_i(s)$ in a shift amount calculation area with the mean being the shift amount that is closest to the center of a range to which the smoothing filter is applied. Instead of the averaging filter, the combining unit 14 may use a Gaussian filter as the smoothing filter.

Figure 12:
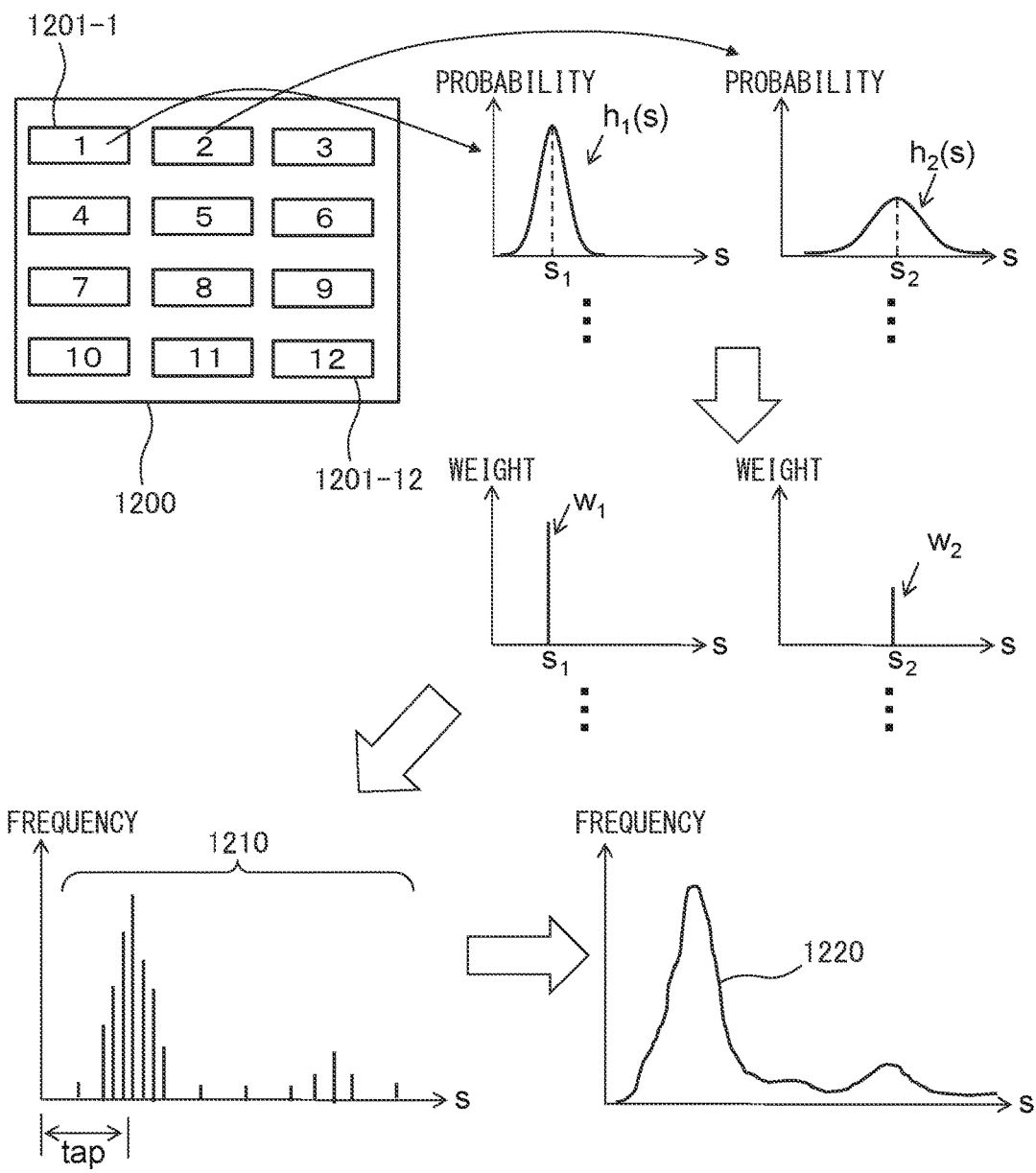
FIG. 12 is a diagram illustrating another example of a histogram to be combined with a probability distribution of local shift amounts in shift amount calculation areas in a measurement area.

FIG. 12 is a diagram illustrating another example of a histogram to be combined with probability distributions of local shift amounts in shift amount calculation areas in a measurement area according to this modified example. In the example illustrated in FIG. 12, twelve shift amount calculation areas 1201-1 to 1201-12 are included in a measurement area 1200. Probability distributions $h_1(s)$ to $h_{12}(s)$ of local shift amounts for the shift amount calculation areas are obtained. For the individual shift amount calculation areas, weights $w_i$ are assigned to shift amounts $s_1$ to $s_{12}$ that are means of the probability distributions $h_i(s)$. A discrete histogram 1210 is obtained by adding up the weights $w_i$ of the shift amount calculation areas. Then a smoothing filter is applied to the discrete histogram 1210 to obtain a histogram 1220. In FIG. 12, the horizontal axis of the graphs representing the discrete histogram and the graph representing the histogram 1220 represents shift amount and the vertical axis represents frequency.

The combining unit 14 outputs the obtained histogram to the representative value calculating unit 15.

The representative value calculating unit 15 calculates a representative shift amount representing a focus position for a subject appearing in the measurement area and an estimated standard deviation of the representative shift amount on the basis of histogram representing a distribution of the accuracy of local shift amounts in the entire measurement area.

In this embodiment, the representative value calculating unit 15 selects, for example, shift amount calculation areas in which a shift amount that is the mean of the probability distributions $h_i(s)$ of local shift amounts is included within a predetermined range centered at the shift amount $s_{max2}$ that has the maximum frequency in the histogram. The predetermined range may be the range from $(s_{max2}-\text{tap}/2)$ to $(s_{max2}+\text{tap}/2)$, for example, where tap can be calculated in accordance with equation (22).

For example, the representative value calculating unit 15 obtains a shift amount that is the mean of the sums of probability distributions of local shift amounts for the selected shift amount calculation areas as a representative shift amount of the measurement area and obtains the standard deviation of the sum of the probability distributions as an estimated standard deviation. Thus, when a plurality of subjects at different distances from the imaging unit 2 appear in an measurement area, the representative value calculating unit 15 can obtain a representative shift amount so as to cause the imaging unit 2 to focus on a subject that has the highest contrast among the plurality of subjects.

Figure 13:
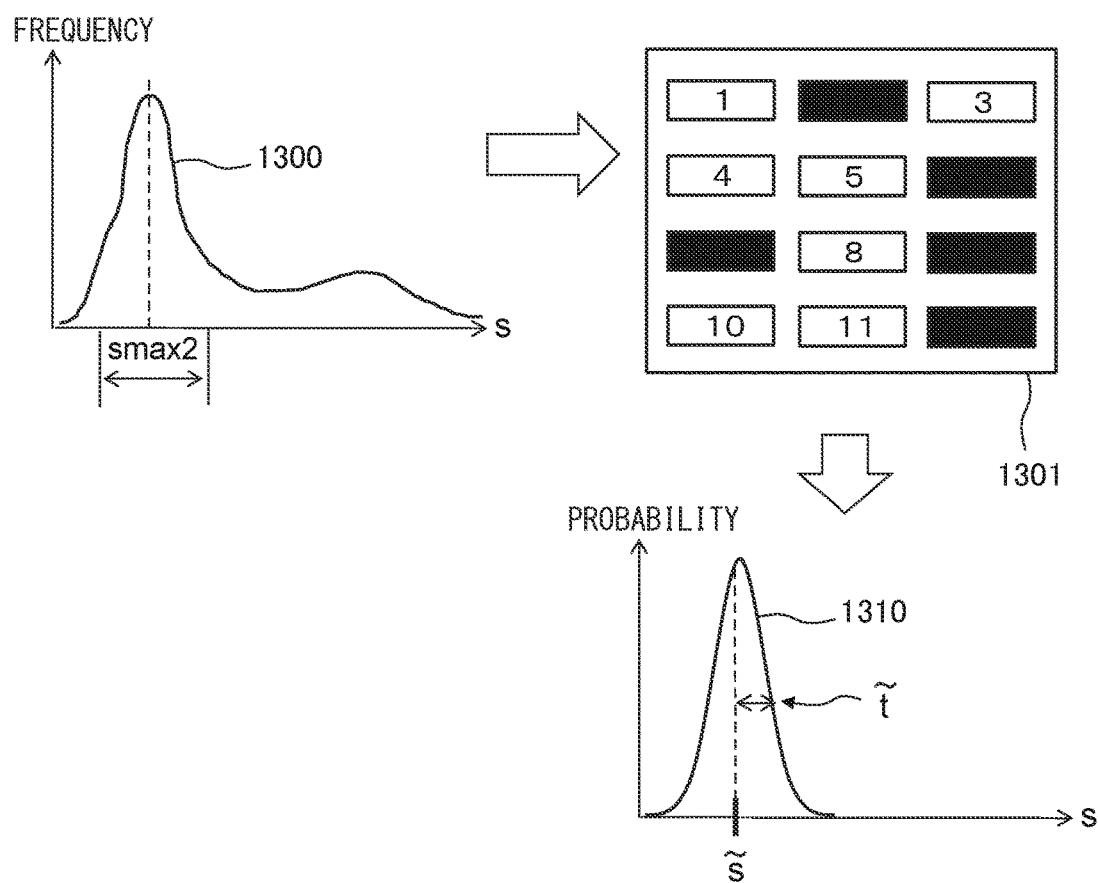
FIG. 13 is a diagram illustrating an example of a histogram representing a distribution of accuracy of local shift amounts in an entire measurement area and a relationship between a representative shift amount and an estimated standard deviation.

FIG. 13 is a diagram illustrating an example of a histogram representing a distribution of the accuracy of local shift amounts in an entire measurement area and a relationship between representative shift amount and estimated standard deviation. In FIG. 13, the horizontal axis of the left-hand histogram 1300 represents shift amount and the vertical axis represents frequency. In this example, shift amount calculation areas in a measurement area 1301 in which a shift amount that is the mean of the probability distributions $h_i(s)$ of local shift amounts is included within a predetermined range centered at a shift amount $s_{max2}$ having the maximum frequency in the histogram 1300 are 1, 3 4, 5, 8, 10 and 11. In this case, a probability distribution 1310 which is the sum of the probability distributions $h_i(s)$ of local shift amounts in the shift amount calculation areas is calculated. A shift amount which is the mean of the probability distribution 1310 is a representative shift amount s⁻ and the standard deviation of the representative shift amount is an estimated standard deviation t⁻.

The representative value calculating unit 15 can obtain the mean and standard deviation of the sums of the probability distributions of local shift amounts in the selected shift amount calculation areas as follows.

For example, the representative value calculating unit 15 defines a weight $w_j$ of the probability distribution $h_j(s)$ of a local shift amount in a selected shift amount calculation area j (j=1, 2, . . . , L, where L is the number of the selected shift amount calculation areas) in accordance with the following equation.

$$w_j = 1/v_j \qquad (23)$$

where $v_j$ represents the variance of the probability distribution $h_j(s)$. Setting weights $w_j$ in this way minimizes the standard deviation of the sum of probability distributions and increases the probability that a representative shift amount with a smaller error can be obtained.

The representative value calculating unit 15 can use the weight $w_j$ to calculate a shift amount that is the mean of the probability distributions of local shift amounts in the selected shift amount calculation areas, i.e., a representative shift amount s⁻, and an estimated standard deviation t⁻ in accordance with the following equations.

$$\tilde{s} = \frac{\sum_{j=1}^{L} w_j s_j}{\sum_{j=1}^{L} w_j} \qquad (24)$$

$$\tilde{t} = \sqrt{\frac{\sum_{j=1}^{L} (w_j t_j)^2}{\sum_{j=1}^{L} (w_j)^2}} \qquad (25)$$

where $s_j$ is a shift amount that is the mean of the probability distribution $h_j(s)$ of a j-th local shift amount.

The control unit 6 can cause the imaging unit 2 to focus on a subject appearing in the measurement area by moving the imaging optical system 22 along the optical axis by an amount equivalent to the representative shift amount and therefore the representative shift amount represents the focus position. The representative value calculating unit 15 outputs the representative shift amount and the estimated standard deviation to the focusing unit 16. Note that when the focusing unit 16 does not use a contrast detection method at the same time as will be described later, the representative value calculating unit 15 may omit the calculation of estimated standard deviation.

The focusing unit 16 refers to a focus table to obtain the amount of rotation of the stepping motor that is equivalent to the amount of movement of the imaging unit 2 that corresponds to the representative shift value. The focusing unit 16 then outputs a control signal for causing the stepping motor of the actuator 23 of the imaging unit 2 to rotate by the obtained amount of rotation minus an amount of rotation that is equivalent to the difference between the current position of the imaging unit 2 and the reference position of the imaging unit 2 to the actuator 23. The actuator 23 causes the stepping motor to rotate by the amount of rotation according to the control signal to move the imaging optical system 22 along the optical axis so that the representative shift amount becomes 0. Thereby, the imaging unit 2 can focus on the subject appearing in a measurement area.

According to a modified example, the focusing unit 16 may use a contrast detection method with the phase difference detection method to cause the imaging unit 2 to focus on a subject appearing in a measurement area. In this case, the focusing unit 16 first causes the stepping motor of the actuator 23 to rotate by an amount of rotation according to a representative shift amount to move the imaging optical system 22 along the optical axis so that the representative shift amount becomes 0, as described above. Then the focusing unit 16 sets a range of the position of the imaging optical system 22 within which the contrast of the subject is checked, on the basis of an estimated standard deviation received from the representative value calculating unit 15. For example, the focusing unit 16 sets a range equivalent to ±2 times the estimated standard deviation as the range of the position of the imaging optical system 22 within which the contrast of the subject is checked. The focusing unit 16 then finds the position of the imaging optical system 22 at which the contrast in a region equivalent to a measurement area on an image obtained by the imaging unit 2 is maximum while causing the imaging optical system 22 to move within the range. The focusing unit 16 sets the position of the imaging optical system 22 at which the contrast is maximum as the position at which the imaging optical system 22 focuses on the subject appearing in the measurement area. Note that when there is not a position at which the contrast is maximum within the set range of the position of the imaging optical system 22, the focusing unit 16 may find a position of the imaging optical system 22 at which the contrast is maximum outside the range.

In this way, the focusing unit 16 is capable of appropriately setting a range of the position of the imaging optical system 22 within which contrast is checked using the contrast detection method even when the contrast detection method is used with the phase difference detection method. Accordingly, the focusing unit 16 can reduce the time required for the imaging unit 2 to focus on a subject in the measurement area.

FIG. 14 is an operation flowchart of a focus position detection process executed by the control unit 6. The control unit 6 acquires a captured image of a subject from the imaging unit 2 (step S101). The control unit 6 then stores the image in the memory unit 5.

The shift amount calculation area identifying unit 11 identifies shift amount calculating areas included in a specified measurement area (step S102). The shift amount calculation area identifying unit 11 then provides the identified shift amount calculation areas to the feature quantity calculating unit 12.

The feature quantity calculating unit 12 calculates, for each of the shift amount calculation areas, a local shift amount at which a left-hand image and a right-hand image are most coincident with each other and a feature quantity representing the probability distribution of the local shift amount on the basis of the image stored in the memory unit 5 (step S103). The feature quantity calculating unit 12 then outputs the local shift amount and the feature quantity of each shift amount calculation area to the probability distribution estimating unit 13.

The probability distribution estimating unit 13 obtains, for each shift amount calculation area, the mean of the probability distributions of SAD values and an estimated variance value for individual shift amounts on the basis of the local shift amount and the feature quantity (step S104). The probability distribution estimating unit 13 estimates, for each shift amount calculation area, the probability distribution of the local shift amount on the basis of the mean of the probability distribution of the SAD value for individual shift amounts and the estimated variance value (step S105). The probability distribution estimating unit 13 outputs the estimated probability distribution of the local shift amount in each shift amount calculation area to the combining unit 14.

The combining unit 14 combines the estimated probability distributions of the local shift amounts for the shift amount calculation areas to generate a histogram representing a distribution of the accuracy of the local shift amounts for the entire measurement area (step S106). The combining unit 14 outputs the histogram to the representative value calculating unit 15.

The representative value calculating unit 15 selects shift amount calculation areas in which a shift amount that is the mean of the probability distributions of the local shift amounts is included within a predetermined range centered at the shift amount that has the maximum frequency in the histogram (step S107). The representative value calculating unit 15 then calculates a shift amount that is equivalent to the mean of the sum of the probability distributions of the local shift amounts for the selected shift amount calculation areas as a representative shift amount for the entire measurement area. In addition, the representative value calculating unit 15 calculates the standard deviation of the sum of the probability distributions as an estimated standard deviation (step S108). The representative value calculating unit 15 outputs the representative shift amount and the estimated standard deviation to the focusing unit 16.

On the basis of the representative shift amount and the estimated standard deviation, the focusing unit 16 causes the imaging optical system 22 of the imaging unit 2 to move along the optical axis so that the imaging unit 2 focuses on the subject appearing in the measurement area (step S109). Then the control unit 6 terminates the focus position detection process.

As has been described above, the focus position detection device estimates the probability distribution of a local shift amount for each of the shift amount calculation areas included in a measurement area and combines the estimated probability distributions to generate a histogram representing a distribution of the accuracy of the local shift amounts. The focus position detection device then obtains a representative shift amount representing a focus position on the basis of the histogram and is thus capable of accurately detecting a focus position even when noise is superimposed on left-hand and right-hand images in each shift amount calculation area. The focus position detection device also obtains a representative shift amount that represents a focus position using the shift amount that has the highest frequency in the histogram as a reference. Therefore, even when a plurality of subjects that are located at different distances from the imaging unit appear in a measurement area, the focus position detection device can cause the imaging unit to focus on a subject that has the highest contrast among the plurality of subjects.

According to a modified example, the focusing unit may assume a shift amount that has the highest frequency in the histogram representing a distribution of the accuracy of local shift amounts as a representative shift amount. In this case, the focusing unit can reduce the amount of computation for obtaining the representative shift amount.

According to another modified example, the focus position detection device may be used in an imaging apparatus that obtains two images that have a parallax with respect to a subject, such as a twin-lens camera, for measuring the distance to the subject as well as detecting a focus position using phase difference detection. In this case, a distance table that indicates a relationship between representative shift amounts and distances to a subject from the imaging apparatus is stored in a memory unit of the imaging apparatus beforehand, for example. A control unit of the imaging apparatus can execute the functions of the control units of any of the embodiments described above on two parallax-images generated by the imaging apparatus to calculate a representative shift amount for the subject appearing in a measurement area set in each image sensor that generates images. Then the control unit can obtain the distance from the imaging apparatus to the subject appearing in the measurement area which corresponds to the representative shift amount with reference to the distance table.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A focus position detection device comprising:
a processor configured to: identify a plurality of shift amount calculation areas included in a measurement area set on an image sensor in an imaging unit including the image sensor which generates an image and an optical system, each of the plurality of shift amount calculation areas generating a first sub-image and a second sub-image which represent a subject appearing in the shift amount calculation area, wherein a shift amount between the subject on the first sub-image and the subject on the second sub-image changes in accordance with a distance between a focus position at which the subject is brought into focus by the optical system and the image sensor;
calculate, for each of the plurality of shift amount calculation areas, a local shift amount of the second sub-image with respect to the first sub-image when the subject on the first sub-image and the subject on the second sub-image are most coincident with each other;
calculate, for each of the plurality of shift amount calculation areas, a feature quantity representing a probability distribution representing accuracy of the local shift amount;
estimate, for each of the plurality of shift amount calculation areas, the probability distribution on the basis of the local shift amount and the feature quantity;
combine the probability distributions of the plurality of shift amount calculation areas to obtain a distribution of accuracy of the local shift amount for the measurement area; and
calculate a representative value representing a distance between a focus position produced by the optical system and the image sensor on the basis of the distribution.

2. The focus position detection device according to claim 1,
wherein the calculating the feature quantity calculates, for each of the plurality of shift amount calculation areas, the sum of absolute differences between pixel values of corresponding pixels of the first sub-image and the second sub-image while shifting the second sub-image with respect to the first sub-image and calculates the feature quantity on the basis of the sum.

3. The focus position detection device according to claim 2,
wherein the calculating the feature quantity calculates, as the feature quantity, a variance feature quantity representing a variance of a probability distribution representing accuracy of the sum for each shift amount of the second sub-image with respect to the first image and a mean feature quantity representing a rate of change in a mean of a probability distribution representing accuracy of the sum with respect to change in the shift amount.

4. The focus position detection device according to claim 3,
wherein the calculating the feature quantity calculates a minimum value of the sum as the variance feature quantity.

5. The focus position detection device according to claim 3,
wherein the calculating the feature quantity calculates, for each of the plurality of shift amount calculation areas, a root square error between pixel values of corresponding pixels of a noiseless image obtained by applying a denoising filter to one of the first sub-image and the second sub-image and the one of the first sub-image and the second sub-image as the variance feature quantity.

6. The focus position detection device according to claim 3,
wherein the calculating the feature quantity calculates, for each of the plurality of shift amount calculation areas, a difference between a maximum pixel value and a minimum pixel value of one of the first sub-image and the second sub-image or a variance of pixel values of one of the first sub-image and the second sub-image as the mean feature quantity.

7. The focus position detection device according to claim 2,
wherein the calculating the feature quantity calculates the sum for each of a plurality of shift amounts of the second sub-image with respect to the first sub-image as the feature quantity.

8. The focus position detection device according to claim 2,
wherein the estimating the probability distribution calculates, for each of the plurality of shift amount calculation areas, a mean and a variance of a probability distribution representing accuracy of the sum for each of a plurality of shift amounts of the second sub-image with respect to the first sub-image on the basis of the local shift amount and the feature quantities and estimates a probability distribution representing accuracy of the local shift amount on the basis of the mean and the variance.

9. The focus position detection device according to claim 1,
wherein the combining the probability distributions of the plurality of shift amount calculation areas assigns a weight to a shift amount corresponding to a mean of a probability distribution representing accuracy of the local shift amount for each of the plurality of shift amount calculation areas, adds up the weights of the shift amounts, one by one, in each of the plurality of shift amount calculation areas, and applies a smoothing filter to obtain the distribution, wherein the smaller the variance of the probability distribution, the greater the weight is.

10. The focus position detection device according to claim 1,
wherein the calculating the representative value selects the shift amount calculation areas in which a shift amount equivalent to a mean of the probability distribution is included within a predetermined range including a shift amount having the highest accuracy in the distribution from among the plurality of shift amount calculation areas and calculates a shift amount corresponding to a mean of a sum of the probability distributions for the selected shift amount calculation areas as the representative value.

11. A method for detecting a focus position comprising:
identifying, by a processor, a plurality of shift amount calculation areas included in a measurement area set on an image sensor in an imaging unit including the image sensor which generates an image and an optical system, each of the plurality of shift amount calculation areas generating a first sub-image and a second sub-image which represent a subject appearing in the shift amount calculation area, wherein a shift amount between the subject on the first sub-image and the subject on the second sub-image changes in accordance with a distance between a focus position at which the subject is brought into focus by the optical system and the image sensor;
calculating, by the processor, for each of the plurality of shift amount calculation areas, a local shift amount of the second sub-image with respect to the first sub-image when the subject on the first sub-image and the subject on the second sub-image are most coincident with each other;
calculating, by the processor, for each of the plurality of shift amount calculation areas, a feature quantity representing a probability distribution representing accuracy of the local shift amount;
estimating, by the processor, for each of the plurality of shift amount calculation areas, the probability distribution on the basis of the local shift amount and the feature quantity;
combining, by the processor, the probability distributions of the plurality of shift amount calculation areas to obtain a distribution of accuracy of the local shift amount for the measurement area; and
calculating, by the processor, a representative value representing a distance between a focus position produced by the optical system and the image sensor on the basis of the distribution.

12. The focus position detection method according to claim 11,
wherein the calculating the feature quantity calculates, for each of the plurality of shift amount calculation areas, the sum of absolute differences between pixel values of corresponding pixels of the first sub-image and the second sub-image while shifting the second sub-image with respect to the first sub-image and calculates the feature quantity on the basis of the sum.

13. The focus position detection method according to claim 12,
wherein the calculating the feature quantity calculates, as the feature quantity, a variance feature quantity representing a variance of a probability distribution representing accuracy of the sum for each shift amount of the second sub-image with respect to the first image and a mean feature quantity representing a rate of change in a mean of a probability distribution representing accuracy of the sum with respect to change in the shift amount.

14. The focus position detection method according to claim 13,
wherein the calculating the feature quantity calculates a minimum value of the sum as the variance feature quantity.

15. The focus position detection method according to claim 13,
wherein the calculating the feature quantity calculates, for each of the plurality of shift amount calculation areas, a root square error between pixel values of corresponding pixels of a noiseless image obtained by applying a denoising filter to one of the first sub-image and the second sub-image and the one of the first sub-image and the second sub-image as the variance feature quantity.

16. The focus position detection method according to claim 13,
wherein the calculating the feature quantity calculates, for each of the plurality of shift amount calculation areas, a difference between a maximum pixel value and a minimum pixel value of one of the first sub-image and the second sub-image or a variance of pixel values of one of the first sub-image and the second sub-image as the mean feature quantity.

17. The focus position detection method according to claim 12,
wherein the calculating the feature quantity calculates the sum for each of a plurality of shift amounts of the second sub-image with respect to the first sub-image as the feature quantity.

18. The focus position detection method according to claim 12,
wherein the estimating the probability distribution calculates, for each of the plurality of shift amount calculation areas, a mean and a variance of a probability distribution representing accuracy of the sum for each of a plurality of shift amounts of the second sub-image with respect to the first sub-image on the basis of the local shift amount and the feature quantities and estimates a probability distribution representing accuracy of the local shift amount on the basis of the mean and the variance.

19. The focus position detection method according to claim 11,
wherein the combining the probability distributions of the plurality of shift amount calculation areas assigns a weight to a shift amount corresponding to a mean of a probability distribution representing accuracy of the local shift amount for each of the plurality of shift amount calculation areas, adds up the weights of the shift amounts, one by one, in each of the plurality of shift amount calculation areas, and applies a smoothing filter to obtain the distribution, wherein the smaller the variance of the probability distribution, the greater the weight is.

20. The focus position detection method according to claim 11,
wherein the calculating the representative value selects the shift amount calculation areas in which a shift amount equivalent to a mean of the probability distribution is included within a predetermined range including a shift amount having the highest accuracy in the distribution from among the plurality of shift amount calculation areas and calculates a shift amount corresponding to a mean of a sum of the probability distributions for the selected shift amount calculation areas as the representative value.

21. A non-transitory computer-readable recording medium having recorded thereon a computer program for focus position detection that causes a computer to execute a process comprising:

identifying a plurality of shift amount calculation areas included in a measurement area set on an image sensor in an imaging unit including the image sensor which generates an image and an optical system, each of the plurality of shift amount calculation areas generating a first sub-image and a second sub-image which represent a subject appearing in the shift amount calculation area, wherein a shift amount between the subject on the first sub-image and the subject on the second sub-image changes in accordance with a distance between a focus position at which the subject is brought into focus by the optical system and the image sensor;

calculating, for each of the plurality of shift amount calculation areas, a local shift amount of the second sub-image with respect to the first sub-image when the subject on the first sub-image and the subject on the second sub-image are most coincident with each other and calculating a feature quantity representing a probability distribution representing accuracy of the local shift amount;

estimating, for each of the plurality of shift amount calculation areas, the probability distribution on the basis of the local shift amount and the feature quantity;

combining the probability distributions of the plurality of shift amount calculation areas to obtain a distribution of accuracy of the local shift amount for the measurement area; and calculating a representative value representing a distance between a focus position produced by the optical system and the image sensor on the basis of the distribution.

* * * * *